(12) United States Patent
Hamada

(10) Patent No.: US 10,536,599 B2
(45) Date of Patent: Jan. 14, 2020

(54) ORIGINAL READING APPARATUS

(71) Applicant: CANON KABUSHIKI KAISHA, Tokyo (JP)

(72) Inventor: Kaoru Hamada, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/262,321

(22) Filed: Jan. 30, 2019

(65) Prior Publication Data

US 2019/0245995 A1 Aug. 8, 2019

(30) Foreign Application Priority Data

Feb. 6, 2018 (JP) .................................. 2018-019069

(51) Int. Cl.
*H04N 1/00* (2006.01)
(52) U.S. Cl.
CPC ..... *H04N 1/00745* (2013.01); *H04N 1/00734* (2013.01); *H04N 1/00777* (2013.01)
(58) Field of Classification Search
CPC ........................ H04N 1/00745; H04N 1/00734
See application file for complete search history.

(56) References Cited

U.S. PATENT DOCUMENTS

| 10,148,851 B2 | 12/2018 | Furukawa et al. ... H04N 1/3263 |
| 2009/0232523 A1* | 9/2009 | Miyauchi ............... G03G 15/55 399/21 |
| 2013/0050783 A1* | 2/2013 | Sato ................... H04N 1/00652 358/498 |

FOREIGN PATENT DOCUMENTS

JP 2000-174988 6/2000

* cited by examiner

*Primary Examiner* — Ibrahim Siddo
(74) *Attorney, Agent, or Firm* — Venable LLP

(57) ABSTRACT

A reader CPU stops a lead motor in a case in which a discharge sensor cannot detect reaching of a leading edge part of an original D even though the original is conveyed by a first amount ($L_{P3}+L_{M1}$) or a second amount ($L_{P3}+L_{M2}$) which is smaller than the first amount from when a lead sensor detects the original, when a reader image processing portion (leading edge detection portion) cannot detect the leading edge part of the original from image data of a first face of the original.

3 Claims, 12 Drawing Sheets

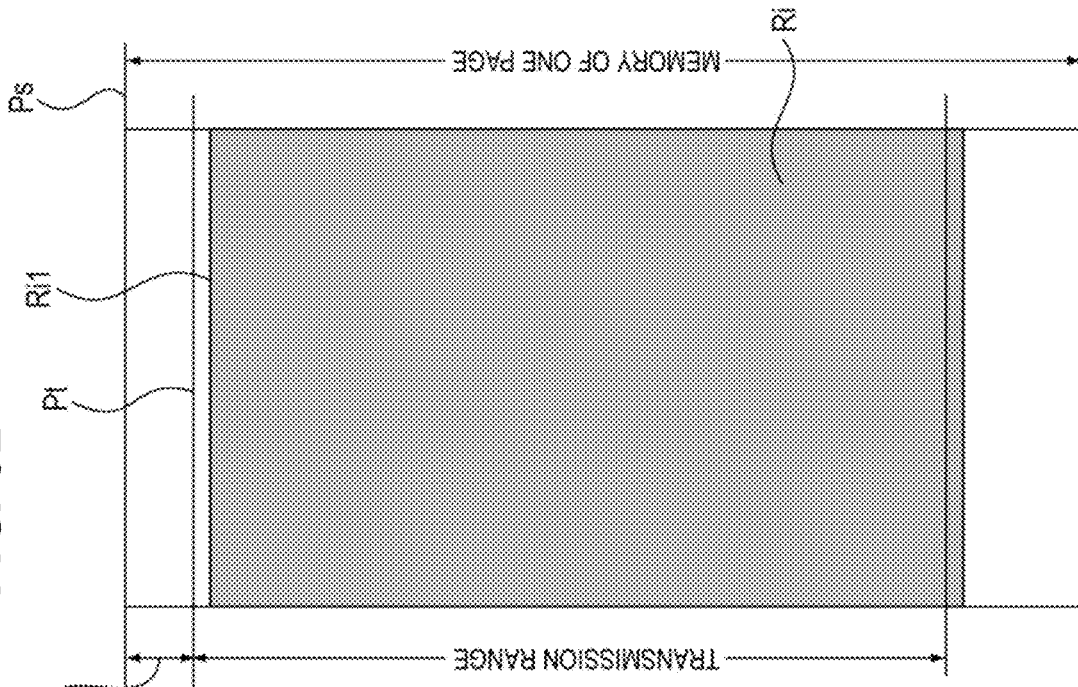
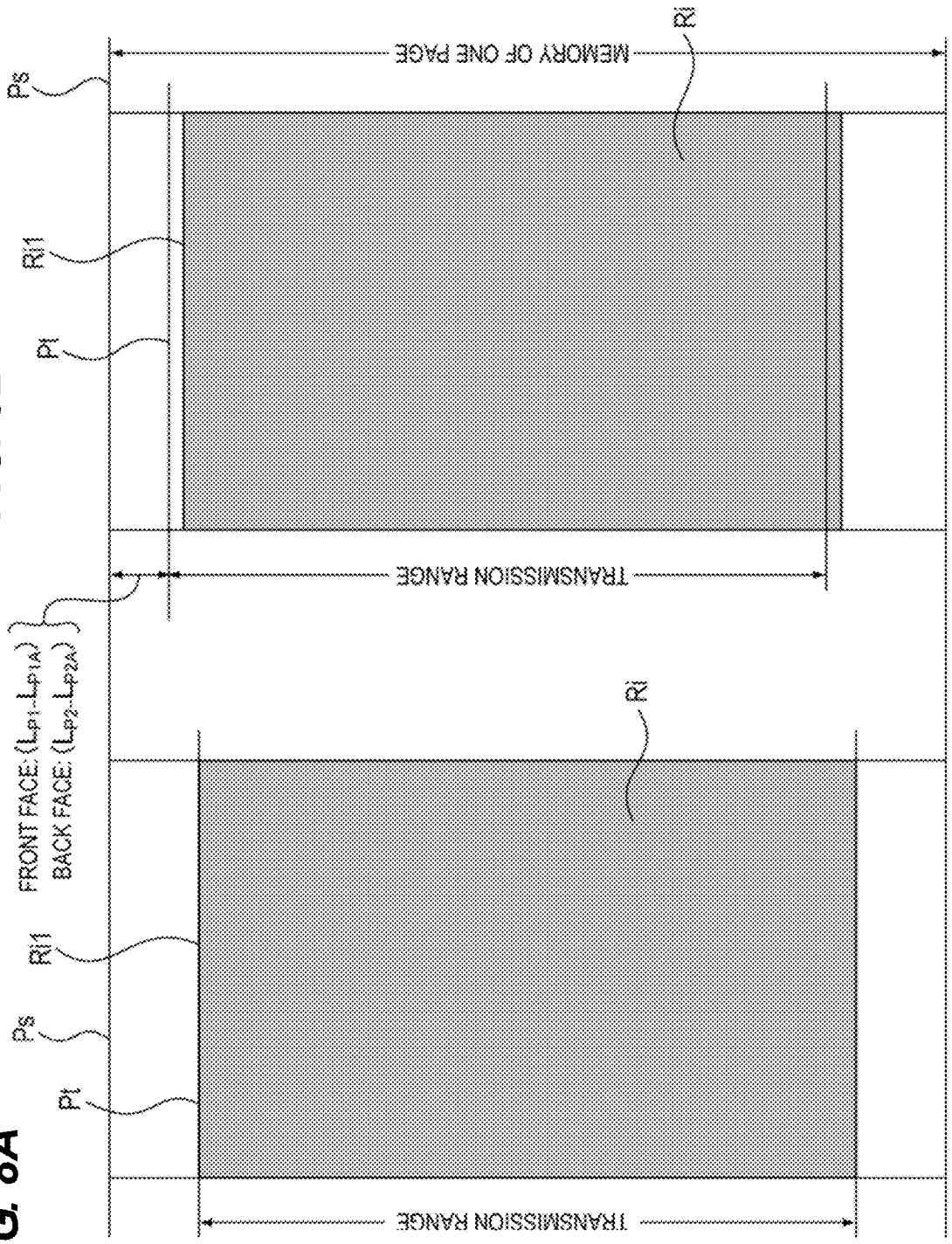

ORIGINAL READING APPARATUS

BACKGROUND OF THE INVENTION

Field of the Invention

The present invention relates to an original reading apparatus.

Description of the Related Art

A plurality of originals put on an original tray is consecutively conveyed one by one by an automatic document feeder (ADF). Further, an automatic original reading apparatus reading an original image by an image sensor fixed on a predetermined skimming position is generally used. In the ADF, detection of a leading edge and a trailing edge of the original is performed by a plurality of original detection sensors disposed on a conveyance path. Further, detection of a jam of the original is performed based on a time taken from detection of the leading edge and the trailing edge of the original by the original detection sensor at an upstream to detection of the leading edge and the trailing edge of the original by the original detection sensor at a downstream, or a conveyance distance.

In Japanese Patent Laid-Open No. 2000-174988, the leading edge and the trailing edge of the original are detected without using the original detection sensor. As a method therefor, it is detected that the leading edge of the original reaches a reading position when a shade cast on a conveying roller by the leading edge of the original is detected based on image data read by a line sensor for reading the original.

The number of original detection sensors disposed on the conveyance path can be as small as possible for cost reduction and miniaturization of the apparatus. However, if the number of original detection sensors is reduced, a problem that damage to the original becomes severe in a case in which a jam of the original occurs at an upstream of a section in which the jam of the original is detected occurs.

There is also a method of using a line sensor as disclosed in Japanese Patent Laid-Open No. 2000-174988, instead of the original detection sensor. However, when conveying a thin paper original, sometimes the shadow of the leading edge of the original is not clearly cast. In this case, there is a problem that it is determined that the leading edge of the original does not reach the reading position and thus misdetection of the jam of the original occurs.

It is desirable to provide an original reading apparatus preventing misdetection of a jam of an original and suppressing damage to the original due to a delay of jam detection.

SUMMARY OF THE INVENTION

A representative configuration of an original reading apparatus according to the present invention to achieve the above object includes: a feeding portion which feeds an original put on an original tray one by one to a conveyance path; a conveyance portion which conveys the original along the conveyance path; a discharge portion which discharges the original conveyed along the conveyance path onto a discharge tray; a driving device which drives the conveyance portion; a first reading portion which reads a first face of the original conveyed along the conveyance path; a first sensor which is disposed at an upstream of the first reading portion in a conveyance direction of the original and detects the original; a second sensor which is disposed at a downstream of the first reading portion in the conveyance direction of the original and detects the original; a leading edge detection portion which detects reaching of a leading edge part of the original to the first reading portion from image data of the first face read by the first reading portion; and a controller which stops the driving device when the second sensor does not detect the original even though the original is conveyed by a first amount or a second amount which is smaller than the first amount from when the original is detected by the first sensor, wherein the first amount is set when the leading edge detection portion detects the leading edge part of the original from the image data of the first face, and the second amount is set when the leading edge detection portion does not detect the leading edge part of the original from the image data of the first face.

Further features of the present invention will become apparent from the following description of exemplary embodiments with reference to the attached drawings.

BRIEF DESCRIPTION OF THE DRAWINGS

FIG. 8A is a diagram illustrating an arrangement of an original image area on an image memory when the detection of the leading edge part of the original succeeds, and FIG. 8B is a diagram illustrating an arrangement of the original image area on the image memory when the detection of the leading edge part of the original fails.

DESCRIPTION OF THE EMBODIMENTS

An original reading apparatus according to an embodiment of the present invention will be described in detail with reference to the accompanying drawings.

<Original Reading Apparatus>

Figure 1:
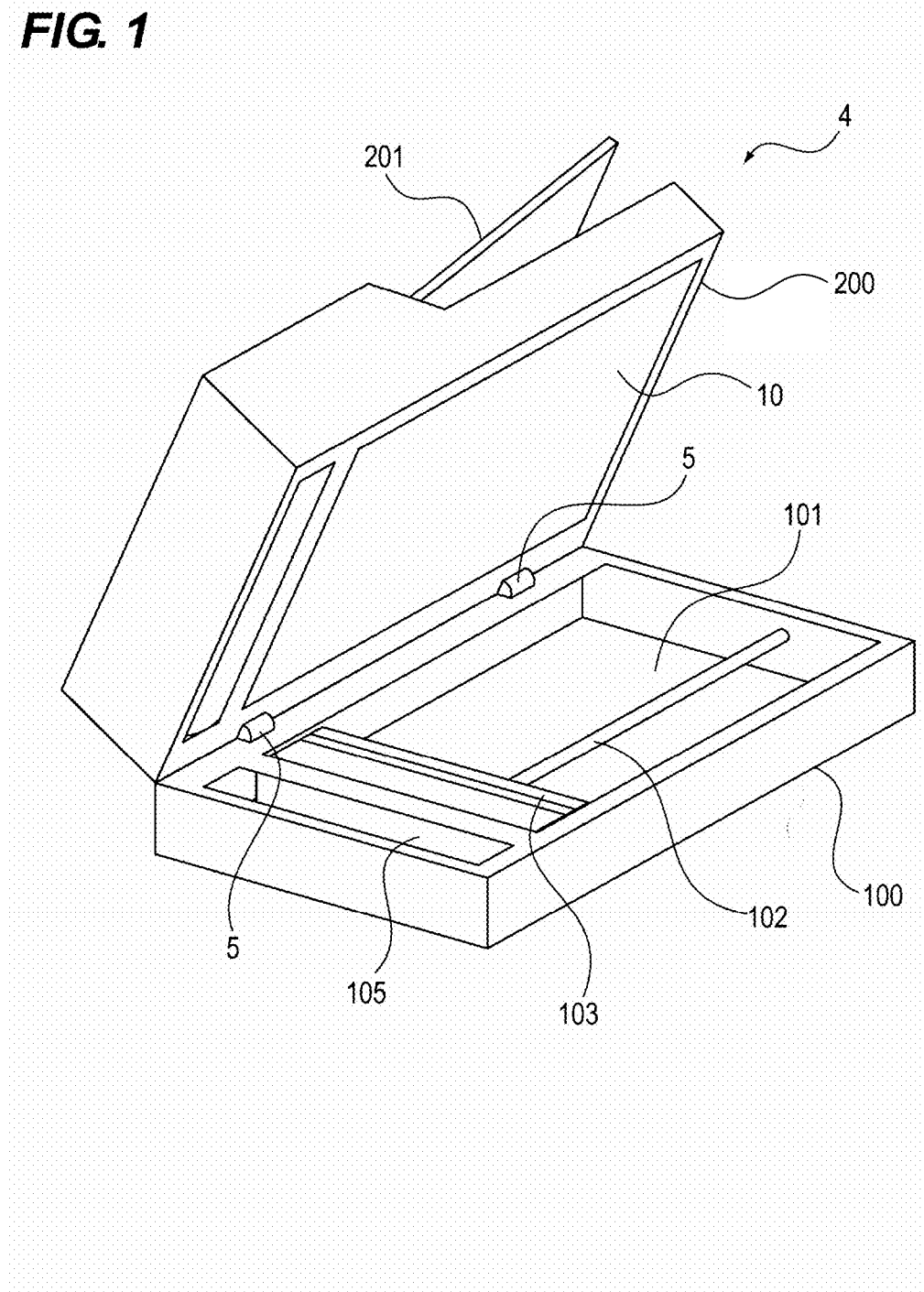
FIG. 1 is a perspective diagram illustrating a configuration of an original reading apparatus according to the present invention.
Figure 2:
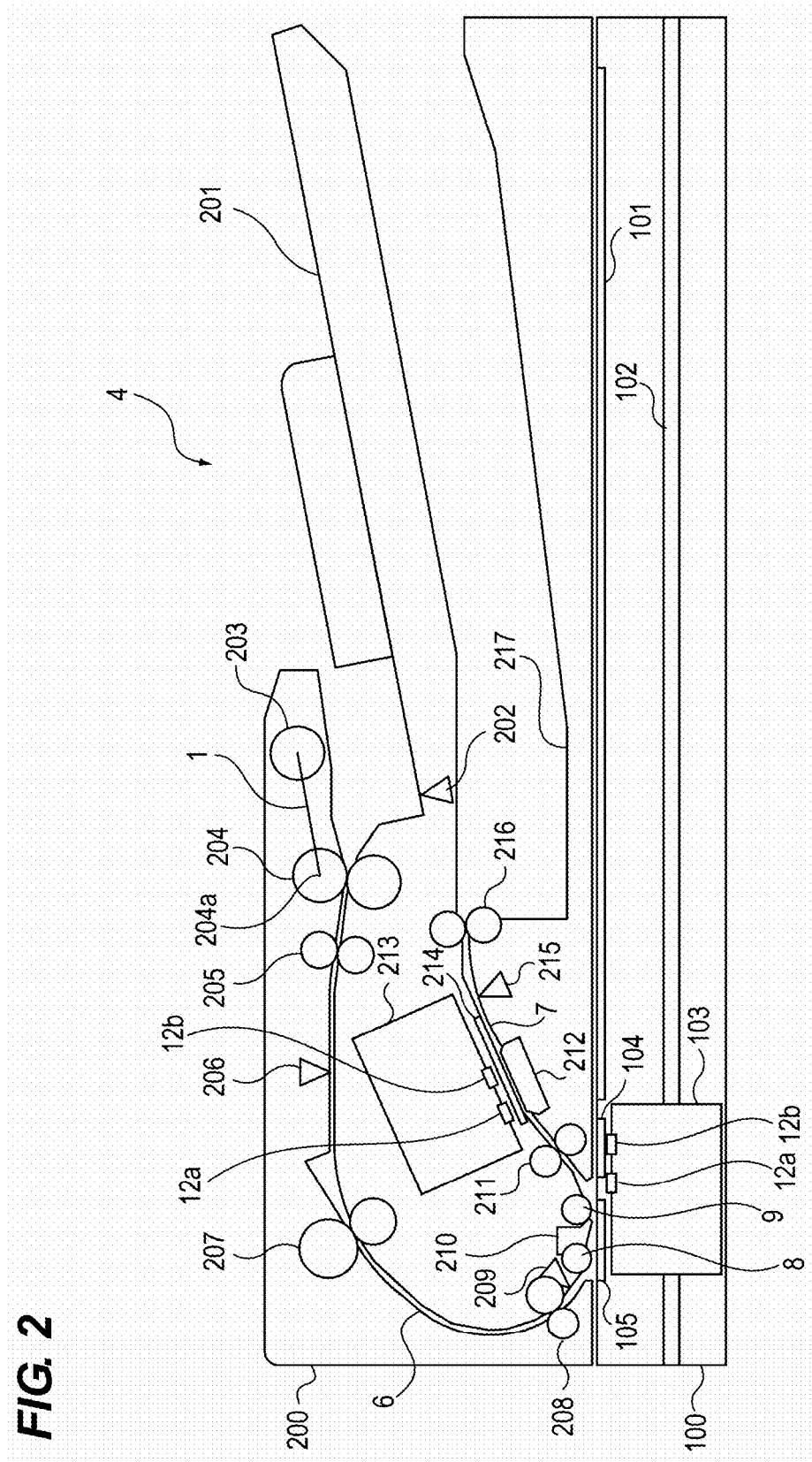
FIG. 2 is a cross-sectional diagram illustrating the configuration of the original reading apparatus according to the present invention.
Figure 3:
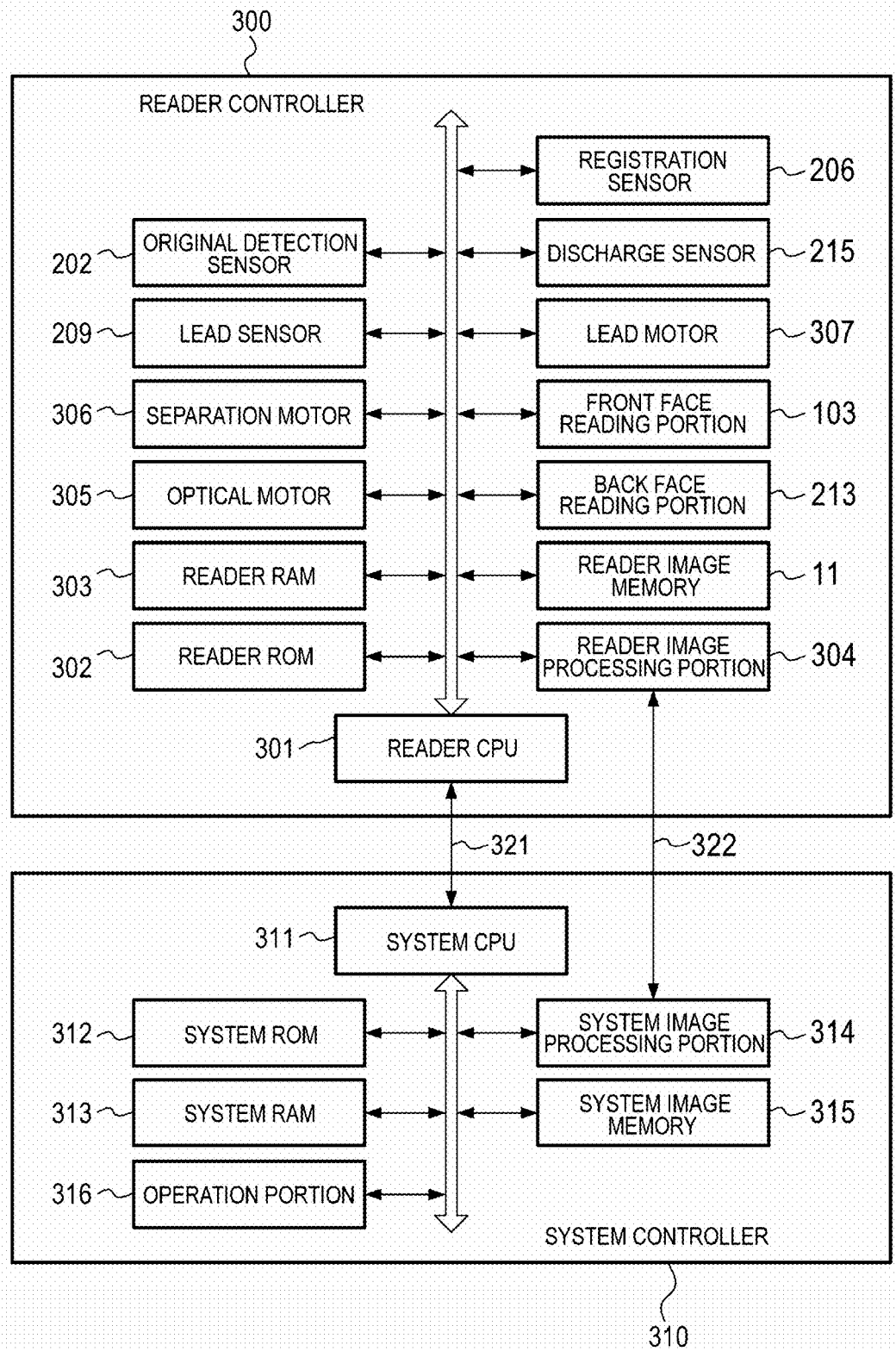
FIG. 3 is a block diagram illustrating a configuration of a controller of the original reading apparatus according to the present invention.

A configuration of the original reading apparatus according to the present invention will be described with reference to FIGS. 1 to 3. FIG. 1 is a perspective diagram illustrating a configuration of the original reading apparatus according to the present invention. FIG. 2 is a cross-sectional diagram illustrating a configuration of the original reading apparatus according to the present invention. FIG. 3 is a block diagram illustrating a configuration of a controller of the original reading apparatus according to the present invention. As illustrated in FIGS. 1 and 2, an original reading apparatus 4 includes an automatic document feeder (ADF) 200 which is a conveyance portion conveying an original D and a reading portion 100 reading an original image. The ADF 200 is configured to be openable with respect to the reading portion 100 by an opening and closing hinge 5 disposed at an inner side of an upper surface of the reading portion 100.

<Reading Portion>

A configuration of the reading portion 100 will be described with reference to FIGS. 2 and 3. The reading portion 100 illustrated in FIG. 2 includes an original base plate glass 101, a front face reading portion 103, an optical motor 305 illustrated in FIG. 3, a movement guide 102, and a white reference member 104. The reading portion 100 performs reading of a front face image of the original D by reading a front face of the original D put on the original base plate glass 101 line by line while moving the front face reading portion 103 along the movement guide 102 by using the optical motor 305.

A front face skimming glass 105 illustrated in FIGS. 1 and 2 reads, by the front face reading portion 103, the front face image of the original D conveyed onto the front face skimming glass 105 by the ADF 200. The front face reading portion 103 is configured as a first reading portion reading an image of the front face which is a first face of the original D conveyed along conveyance paths 6 and 7.

<ADF>

A configuration of the ADF 200 will be described with reference to FIG. 2. As illustrated in FIG. 2, the ADF 200 includes an original tray 201 on which a bundle of originals formed by stacking one or more originals D in a sheet form is put. Further, the ADF 200 includes a pick-up roller 203 which is a feeding portion feeding an uppermost original D first by contacting the original D put on the original tray 201. Further, the ADF 200 includes a separation roller 204 separately feeding the original D fed by the pick-up roller 203 one by one. The separation roller 204 (feeding portion) feeds the original D put on the original tray 201 (on the original tray) to the conveyance paths 6 and 7 one by one. The separation roller 204, as a separation mechanism, prevents the bundle of originals from protruding from the original tray 201 and being introduced into a downstream before starting the conveyance of the original D.

The original tray 201 is provided with an original detection sensor 202 detecting an existence or an absence of the original D put on the original tray 201. The pick-up roller 203 is lowered onto an uppermost surface of the bundle of originals put on the original tray 201 and rotated. By doing so, the original D of the uppermost surface of the bundle of originals is conveyed. A sheet of original D of the uppermost surface conveyed by the pick-up roller 203 is separately conveyed by a separation action of the separation roller 204.

The original D separately conveyed one by one by the separation roller 204 is nipped and conveyed by a drawing-out roller 205, and a leading edge part Dt of the original D abuts a nip portion of a stopped registration roller 207. The leading edge part Dt of the original D abutting the nip portion of the registration roller 207 forms a loop, thereby correcting skew feeding of the original D. Thereafter, the original D is nipped and conveyed by the registration roller 207.

The conveyance path 6 for conveying the original D passing through the registration roller 207 toward the front face skimming glass 105 is disposed at a downstream side of the registration roller 207. The original D nipped and conveyed by the registration roller 207 and carried to the conveyance path 6 is nipped and conveyed by a lead roller 208 and carried to a front face reading position 103a (illustrated in FIG. 5A) at which the front face skimming glass 105 is disposed. The lead roller 208 is an example of the conveyance portion conveying the original D along the conveyance paths 6 and 7.

<Operation of Reading Front Face Image of Original>

When reading a front face image of the original D, the front face of the original D passes between the front face skimming glass 105 and a front face opposite member 210. At this time, lights 12a1 and 12b1 emitted from light sources 12a and 12b including a light emitting diode (LED) which are disposed on the front face reading portion 103 below the front face skimming glass 105, are irradiated onto the front face of the original D. Reflected light thereof is read by a light receiving portion including a charge-coupled device (CCD) (not illustrated) which is disposed in the front face reading portion 103, thereby reading the front face image of the original D.

Press rollers 8 and 9 for conveying the original D while pressing the front face of the original D against the front face skimming glass 105 are disposed in a position facing the front face skimming glass 105. The conveyance path 7 for conveying the original D of which the front face image is read toward a back face white opposite member 212 is disposed at a downstream of the press roller 9. The original D conveyed by the press roller 9 and carried to the conveyance path 7 is nipped and conveyed by a lead roller 211 and carried to a back face reading position 213a (illustrated in FIG. 7B) of a back face reading portion 213, in which the back face white opposite member 212 is disposed. The lead roller 211 is an example of the conveyance portion.

<Operation of Reading Images of Both Faces of Original>

When reading images of both the front and back faces of the original D, the front face reading portion 103 reads the front face image of the original D as described above. When reading a back face image of the original D, the back face of the original D passes between a back face skimming glass 214 and the back face white opposite member 212 which are disposed on the conveyance path 7.

At this time, lights 12a1 and 12b1 emitted from light sources 12a and 12b including a light emitting diode (LED) which are disposed on the back face reading portion 213 above the back face skimming glass 214, are irradiated on the back face of the original D. Reflected light which is reflected from the back face of the original D is read by a light receiving portion including a charge-coupled device (CCD) (not illustrated) which is disposed in the back face reading portion 213, thereby reading the back face image of the original D.

The back face reading portion 213 is configured as a second reading portion reading the back face (second face) of the original D conveyed along the conveyance path 7. The back face reading portion (second reading portion) 213 is disposed at a downstream of the front face reading portion (first reading portion) 103 in a conveying direction of the original D, and at the same time, is disposed at an upstream of a discharge sensor (second sensor) 215 in the conveying direction of the original D on the conveyance paths 6 and 7.

The original D, which is nipped by the lead roller 211 and conveyed along the conveyance path 7, is nipped and conveyed by a discharge roller (discharge portion) 216 and discharged onto a discharge tray 217 (onto the discharge tray). Further, as illustrated in FIG. 1, the ADF 200 pivots around the opening and closing hinge 5 and thereby opens with respect to the reading portion 100. In this state, the original D is put on the original base plate glass 101, and the ADF 200 is closed so as to press the back face of the original D by a pressing plate 10.

In this state, the front face reading portion 103 can move along the movement guide 102 to read the front face image of the original D on the original base plate glass 101. A charge-coupled device (CCD) including a reduction optical system in which a mirror is used and of which an optical magnification is smaller than equal magnification, can be applied to the light receiving portion of the front face reading portion 103 or the back face reading portion 213. Besides the CCD, a contact image sensor (CIS) and the like can also be applied.

<Controller>

A reader controller 300 illustrated in FIG. 3 includes a reader CPU 301 which is a central processing unit. Further, the reader controller 300 includes a reader ROM 302 which is a read only memory. Further, the reader controller 300 includes a reader RAM 303 which is a random access memory. A control program is stored in the reader ROM 302, and input data or data for operation are stored in the reader RAM 303.

The reader CPU 301 is connected with a separation motor 306 rotating the pick-up roller 203 and the separation roller 204 which perform an operation of feeding and separating the original D by the ADF 200. Further, the reader CPU 301 is connected with a lead motor 307 rotating the drawing-out roller 205, the registration roller 207, the lead rollers 208 and 211, and the discharge roller 216. The lead motor 307 is an example of a driving device driving the lead roller (conveying roller) 208 as the conveyance portion.

These respective rollers are connected via a driving gear transmitting a rotation driving force from the respective motors. Further, the reader CPU 301 is connected with the original detection sensor 202 detecting the original D put on the original tray 201, a registration sensor 206 detecting the leading edge of the original D on the conveyance path 6, a lead sensor 209, and the discharge sensor 215. The lead sensor 209 is disposed at an upstream of the front face reading portion (first reading portion) 103 in the conveying direction of the original D, and is an example of a first sensor detecting the original D. The discharge sensor 215 is disposed at a downstream of the front face reading portion (first reading portion) 103 in the conveying direction of the original D, and is an example of the second sensor detecting the original D.

The pick-up roller 203 illustrated in FIG. 2 is rotatably supported to the other end part of an arm 1 having one end part disposed to be pivotable around a rotation shaft 204a of the separation roller 204. The original D put on the original tray 201 is fed by the pick-up roller 203. At this time, the arm 1 pivots around the rotation shaft 204a of the separation roller 204 in a clockwise direction in FIG. 2 to come in contact with the original D put on the original tray 201. Then, the pick-up roller 203 is rotated in the clockwise direction in FIG. 2 to feed the original D put on the original tray 201.

The original detection sensor 202 is disposed between the pick-up roller 203 and the separation roller 204 on the conveyance path in a state in which the pick-up roller 203 comes in contact with the original D put on the original tray 201. The registration sensor 206 is disposed between the drawing-out roller 205 and the registration roller 207 on the conveyance path 6. The lead sensor 209 is disposed between the lead roller 208 and the press roller 8 on the conveyance path 6. The discharge sensor 215 is disposed between the back face white opposite member 212 and the discharge roller 216 on the conveyance path 7.

The discharge sensor 215 is disposed at a downstream of the front face reading portion (first reading portion) 103 and the back face reading portion (second reading portion) 213 in the conveying direction of the original D on the conveyance paths 6 and 7, and is configured as an original detection portion detecting the original D. The separation motor 306 and the lead motor 307 according to the present embodiment are a pulse motor. The reader CPU 301 manages rotation of the separation motor 306 and the lead motor 307 by controlling the number of driving pulses applied to the separation motor 306 and the lead motor 307.

The number of driving pulses applied to the separation motor 306 and the lead motor 307 corresponds to a conveyance distance of the original D being conveyed on the conveyance paths 6 and 7. The reader CPU 301 considers the number of driving pulses applied to the separation motor 306 and the lead motor 307. Further, the reader CPU 301 considers a gear ratio of the driving gear transmitting the rotation driving force from the separation motor 306 and the lead motor 307 to the pick-up roller 203 and the separation roller 204, or to the drawing-out roller 205, the registration roller 207, the lead rollers 208 and 211, and the discharge roller 216. The conveyance of the original D is performed by controlling the respective motors based on the conveyance distance of the original D obtained from the number of driving pulses and the gear ratio.

The reader CPU 301 is connected with the front face reading portion 103 which performs an image reading operation by the reading portion 100 and the back face reading portion 213. The reader CPU 301 reads an image of the original D line by line by the front face reading portion 103 and the back face reading portion 213, respectively, and stores the read image in a reader image memory 11.

The reader CPU 301 is connected with a system CPU 311 in a system controller 310 via a command data bus 321. As a result, transmission and reception of data relating to image reading control are performed between the reader CPU 301 and the system CPU 311. A reader image processing portion 304 is connected with a system image processing portion 314 in the system controller 310 via an image data bus 322. As a result, transmission and reception of image data or a synchronization signal are performed between the reader image processing portion 304 and the system image processing portion 314.

When receiving an image transmission request from the system CPU 311 via the command data bus 321, the reader CPU 301 transmits the image to the system image processing portion 314 via the reader image processing portion 304. The reader image processing portion 304 issues a vertical synchronization signal indicating a leading edge of an image via the image data bus 322, and then extracts an image from the reader image memory 11 line by line in synchronization with a horizontal synchronization signal to perform image processing. Thereafter, the reader image processing portion 304 transmits the image to the system image processing portion 314.

The system controller 310 includes the system CPU 311, a system ROM 312, and a system RAM 313. The image data processed in the reader image processing portion 304 are transmitted to the system image processing portion 314 in the system controller 310 via the image data bus 322, subjected to predetermined image processing such as determination of color, and then stored in the system image memory 315. Further, the system controller 310 includes an operation portion 316, and an interface control with a user is performed by the system CPU 311 via a display portion of the operation portion 316.

<Operation of Detecting Discharge Delay Jam when Jam of Plain Paper Original Occurs after Detection of Leading Edge Part>

Figure 4A:
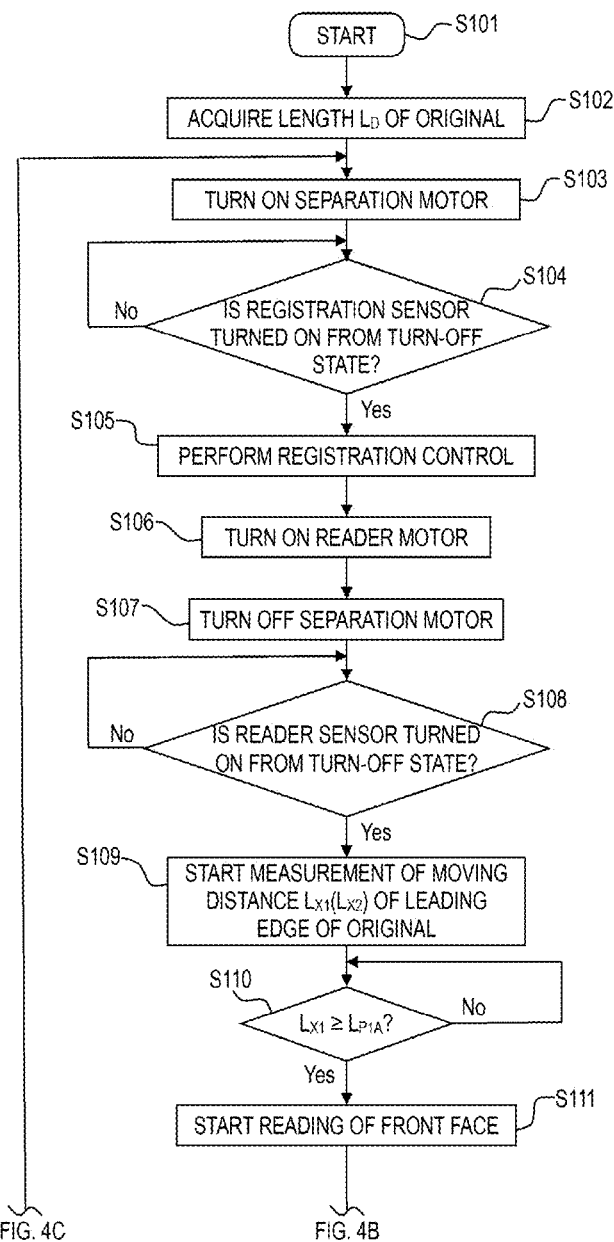
FIGS. 4A to 4C show a flowchart illustrating an operation of skimming an original when applying detection processing of a discharge delay jam of the original.
Figure 4B:
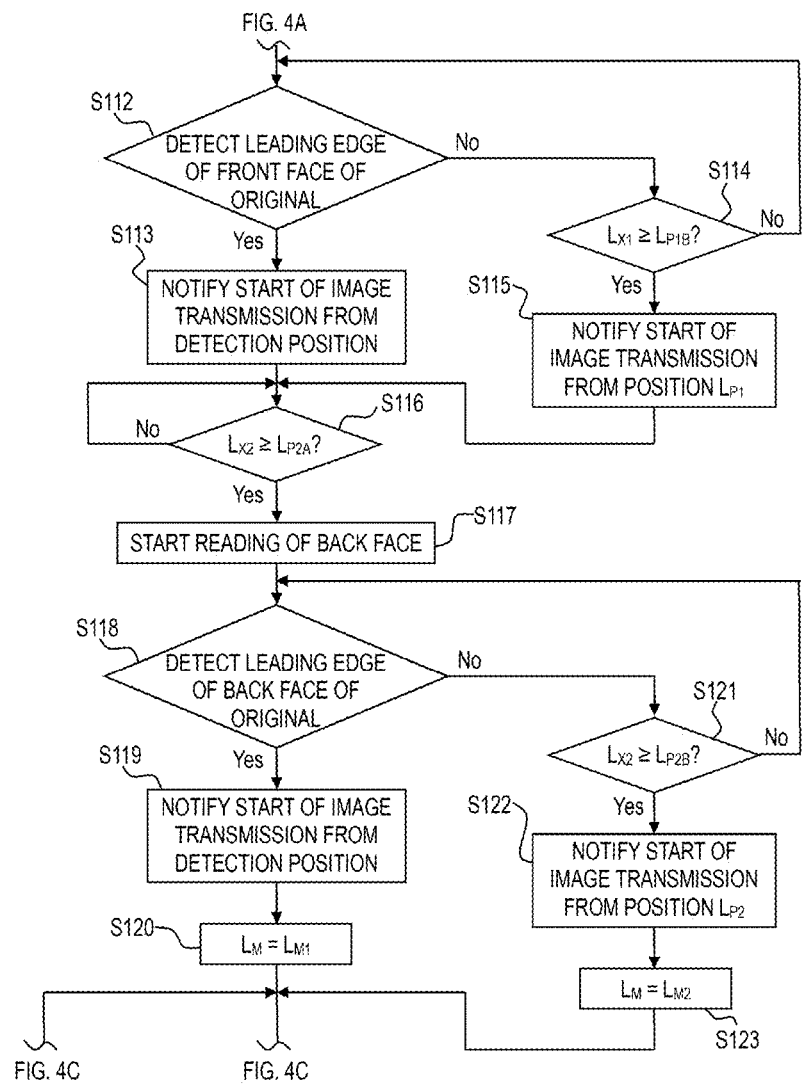
Figure 4C:
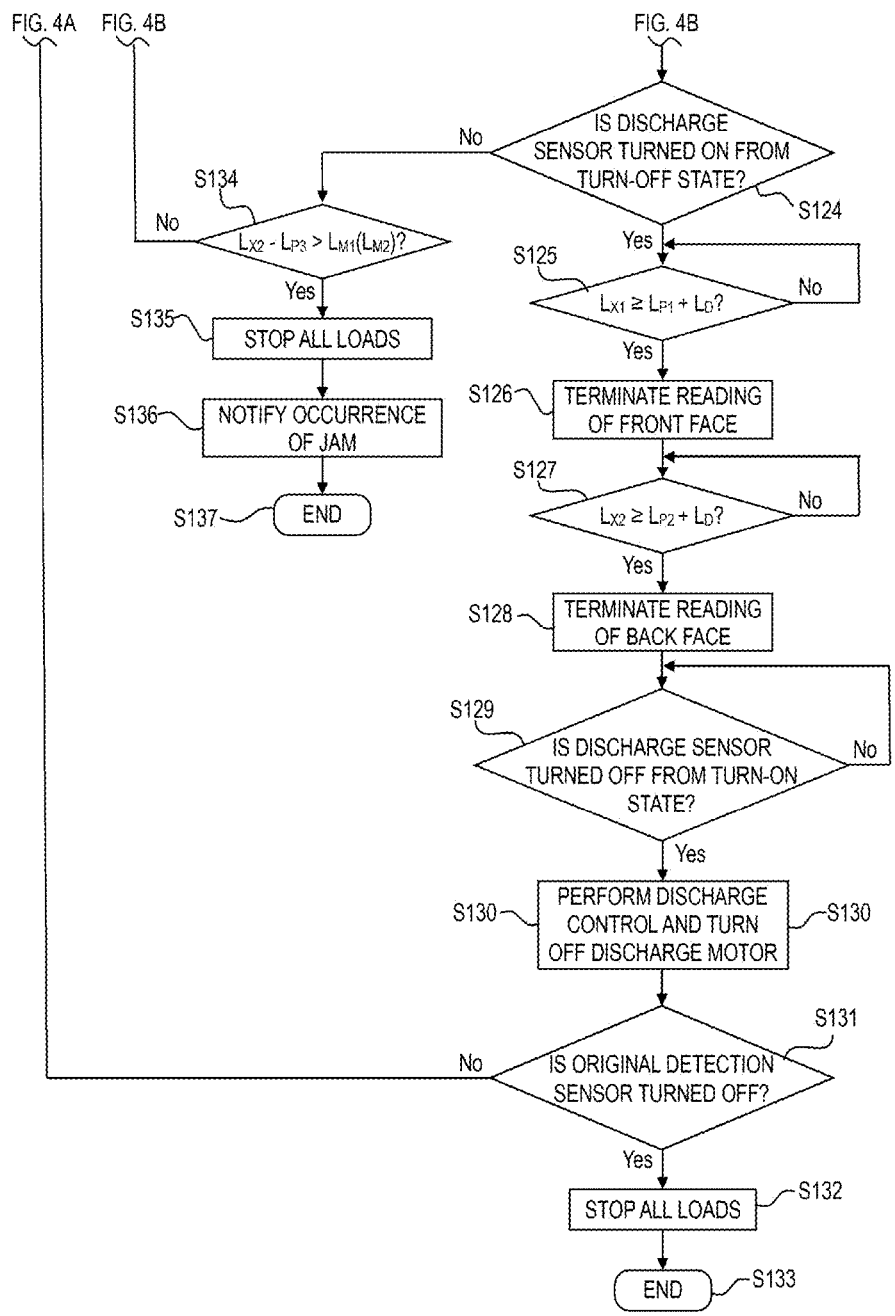

Next, an operation of skimming the original D when detection processing of a discharge delay jam of the original D will be described with reference to FIGS. 4A to 4C. FIGS. 4A to 4C show a flowchart illustrating an operation of skimming the original when applying the detection processing of the discharge delay jam of the original D. A case in which a plain paper original D having a thickness enabling detection of the leading edge part Dt by the reader image processing portion 304 is normally conveyed without being delayed, will be described with reference to FIGS. 4A to 4C.

A control illustrated in FIGS. 4A to 4C is executed by the reader CPU 301. In step S101 of FIG. 4A, the reader CPU 301 starts a skimming control for the original D by the ADF 200. At this time, the pick-up roller 203 retracts upward as illustrated in FIG. 2. The user puts the original D on the original tray 201 in a state in which the pick-up roller 203 retracts. Then, a size of the original is input through the operation portion 316.

In step S102, the reader CPU 301 acquires a length (hereinafter, referred to as "original length") $L_D$ of the original D in the conveyance direction from the reader controller 300. The reader controller 300 calculates the original length $L_D$ based on a size of the original input by the user through the operation portion 316.

As another method for acquiring the original length $L_D$, for example, a pulse count value of each motor from detection of the leading edge part Dt of the original D to detection of a trailing edge part Dr by the respective sensors on the conveyance path 6 while conveying the original D, is considered. Further, a gear ratio of the driving gear via which each motor transmits a driving force to each roller is considered. Then, an original length $L_D$ may be calculated from an advance amount per pulse obtained from the pulse count value and the gear ratio.

Then, in step S103, the reader CPU 301 turns on and rotates the separation motor 306. At this time, the pick-up roller 203 retracting upward as illustrated in FIG. 2 pivots around the rotation shaft 204a of the separation roller 204 in the clockwise direction in FIG. 2 to be lowered, and comes in contact with an uppermost surface of the original D put on the original tray 201. Then, the pick-up roller 203 and the separation roller 204 are rotated, such that the original D is separately fed one by one.

Next, in step S104, the reader CPU 301 monitors the registration sensor 206. The reader CPU 301 waits until the leading edge part Dt of the original D reaches the registration sensor 206 and the registration sensor 206 is turned on from a turn-off state. When it is detected that the registration sensor 206 is turned on from the turn-off state in step S104, the reader CPU 301 performs a registration control by the registration roller 207 in step S105.

Here, the registration control corrects the skew feeding of the original D by making the leading edge part Dt of the original D abut on the nip portion of the stopped registration roller 207 so that the leading edge part Dt of the original D forms a loop. After the leading edge part Dt of the original D forms a loop, in step S106, the reader CPU 301 turns on the lead motor 307 to start the rotation of the lead motor 307, thereby restarting the conveyance of the original D. Thereafter, in step S107, the separation motor 306 is turned off to stop the driving of the separation motor 306, and a feeding control for the original D by the pick-up roller 203 and the separation roller 204 is terminated.

After terminating the feeding control for the original D, the reader CPU 301 starts measurement of a conveyance amount of the original D based on a detection result of the lead sensor 209 which is an example of the first sensor. At this time, the reader CPU 301 performs various controls such as a control of a timing at which detection of leading edge parts Dt of the front and back faces of the original D starts, a timing at which the detection is terminated, a timing at which reading of the original image starts, a timing at which the reading is terminated, detection of the discharge delay jam, or the like based on the conveyance amount of the original D.

In step S108, the reader CPU 301 monitors the detection result of the lead sensor 209 to perform the measurement of the conveyance amount of the original D. Then, the reader CPU 301 waits until the leading edge part Dt of the original D conveyed on the conveyance path 6 reaches the lead sensor 209 and the lead sensor 209 is turned on from a turn-off state.

In step S108, when the lead sensor 209 is turned on from the turn-off state, the reader CPU 301 proceeds to step S109. In step S109, the reader CPU 301 starts measurement of conveyance distances $L_{X1}$ and $L_{X2}$ of the leading edge parts Dt of the front and back faces of the original D, based on a time when the lead sensor 209 is turned on from the turn-off state. At this time, conveyance distances $L_{X1}$ and $L_{X2}$ of the leading edge parts Dt of the front and back faces of the original D based on a detection position 209a of the lead sensor 209 on the conveyance path 6, is considered.

For the conveyance distances $L_{X1}$ and $L_{X2}$ of the leading edge parts Dt of the front and back faces of the original D, a pulse count value of each motor from a time when the leading edge part Dt of the original D reaches the lead sensor 209 and the lead sensor 209 is turned on from the turn-off state, is considered. Further, a gear ratio of the driving gear via which each motor transmits a driving force to each roller is considered. Further, the conveyance distances $L_{X1}$ and $L_{X2}$ are calculated from an advance amount per pulse of each roller obtained from the pulse count value and the gear ratio.

Figure 5A:
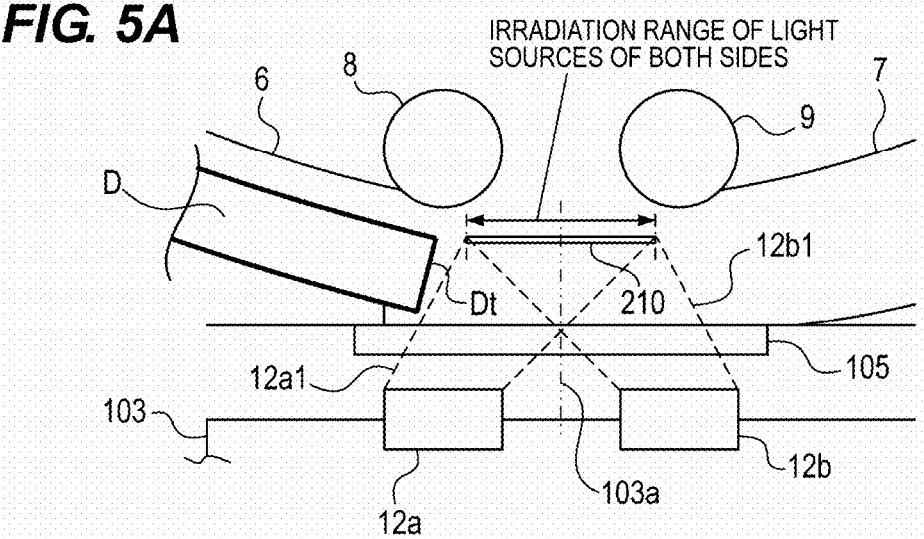
FIGS. 5A to 5C are cross-sectional diagrams illustrating states of the original when a shadow of a leading edge part of the original is cast on a read image when reading a front face of the original.
Figure 5B:
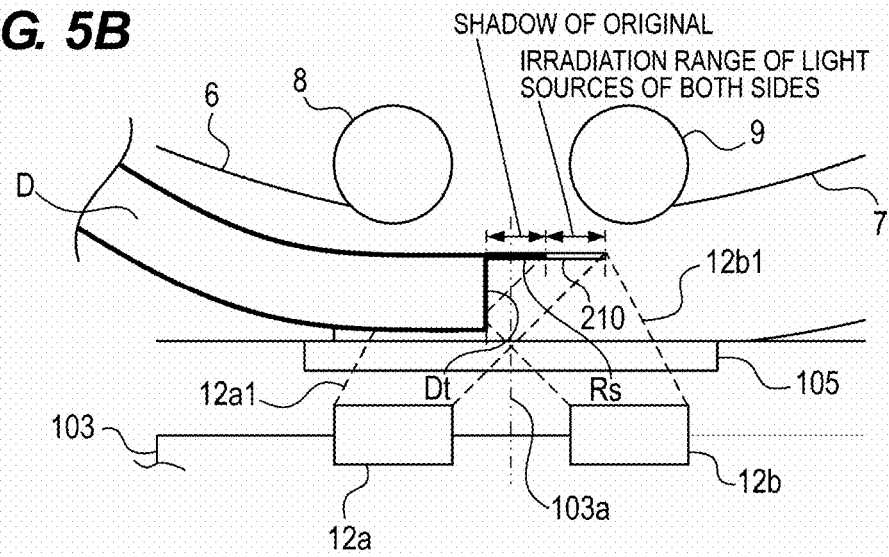
Figure 5C:
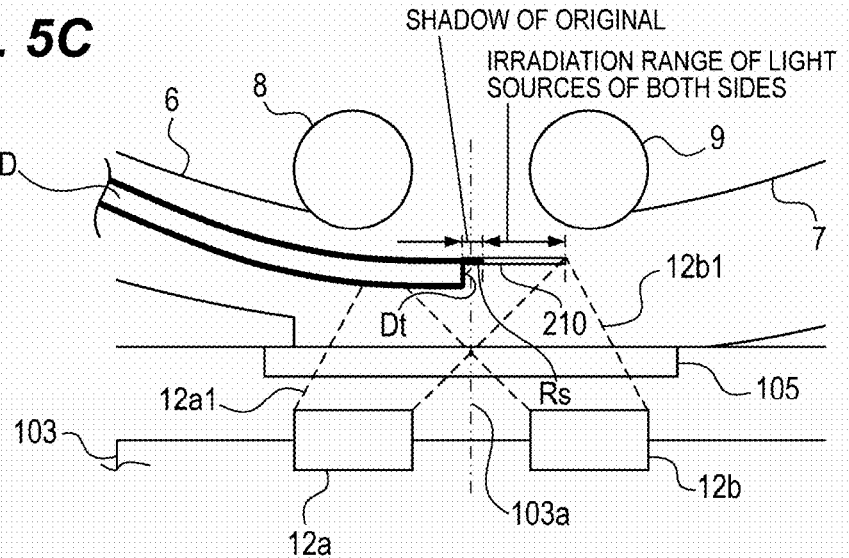
Figure 6A:
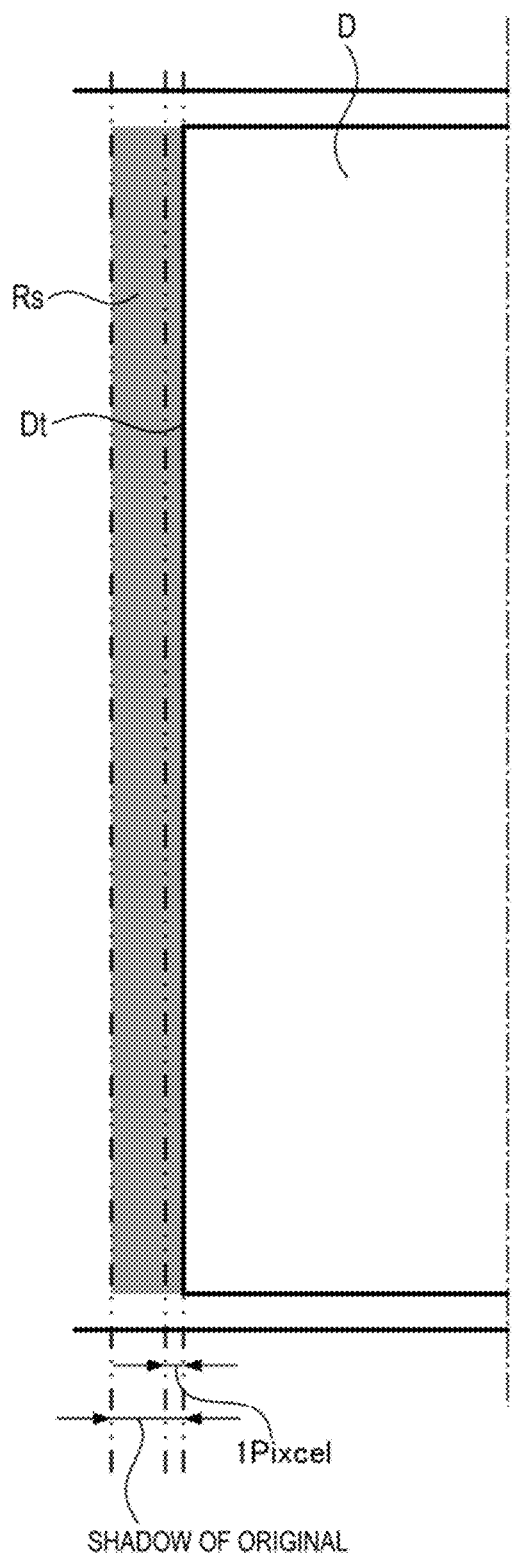
FIGS. 6A and 6B are diagrams illustrating the read images on which the shadow of the leading edge part of the original is cast when reading the front face of the original.
Figure 6B:
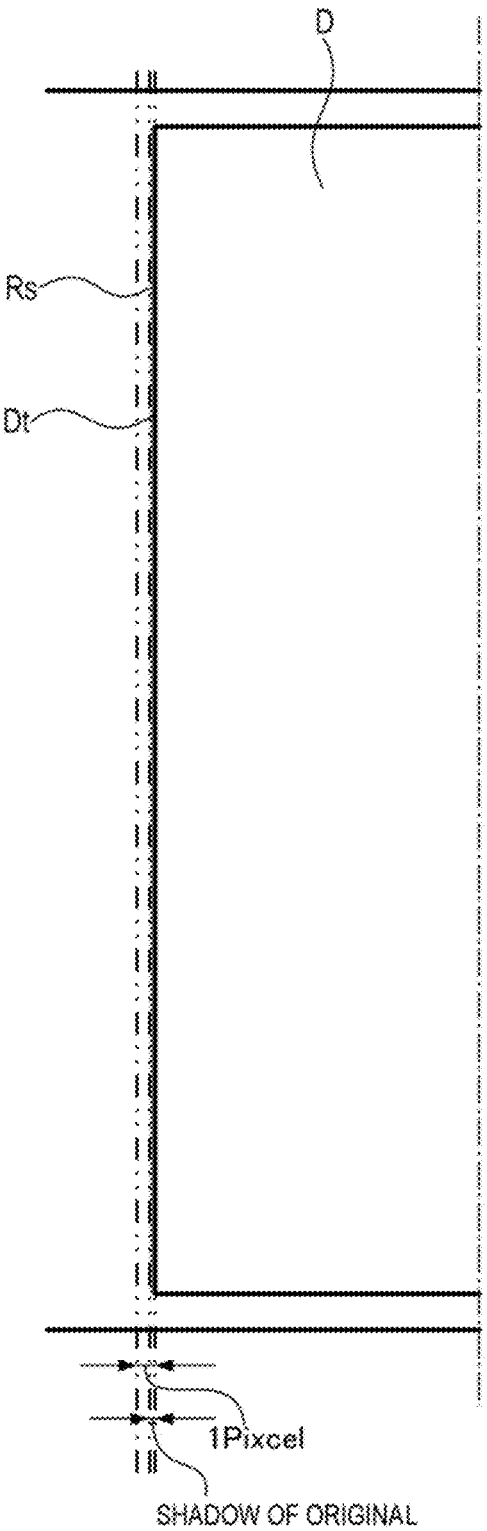

Next, the reader CPU 301 starts detection processing of the leading edge parts Dt of the front and back faces of the original D, respectively, in steps S110 to S123. FIGS. 5A to 5C are cross-sectional diagrams illustrating states of the original D when a shadow Rs of the leading edge part Dt of the front face of the original D is cast on a read image when reading the front face of the original D. FIGS. 6A and 6B are diagrams illustrating the read images on which the shadow Rs of the leading edge part Dt of the front face of the original D is cast when reading the front face of the original D.

As illustrated in FIG. 5A, a state before the leading edge part Dt of the front face of the original D reaches the front face reading position 103a is considered. At this time, the lights 12a1 and 12b1 from the light sources 12a and 12b of the front face reading portion 103 which are disposed at a front side and a back side in the conveyance direction of the original, are irradiated onto the front face opposite member 210. The light receiving portion (not illustrated) disposed in the front face reading portion 103 reads the reflected light from the front face opposite member 210 as an image.

Thereafter, as illustrated in FIG. 5B, the leading edge part Dt of the front face of the original D reaches a position just in front of the front face reading position 103a. Then, the light 12a1 irradiated onto the front face reading position 103a of the front face opposite member 210 from the light source 12a of an introduction side of the original D, is blocked by the original D due to a thickness of the leading edge part Dt of the front face of the plain paper original D. As a result, the shadow Rs of the leading edge part Dt of the front face of the original D is projected on the front face opposite member 210.

As illustrated in FIG. 5B, the shadow Rs of the leading edge part Dt of the front face of the original D, which is projected on the front face opposite member 210 is considered. By the shadow Rs, a light quantity of the reflected light from the front face opposite member 210 illustrated in FIG. 5B becomes smaller than a light quantity of the reflected light from the front face opposite member 210 before the leading edge part Dt of the front face of the original D reaches the front face reading position 103a illustrated in FIG. 5A. For this reason, the dark shadow Rs of the leading edge part Dt of the front face of the original D is read on the read image illustrated in FIG. 6A right before reading the leading edge part Dt of the front face of the original D as illustrated in FIG. 6A.

The reader image processing portion 304 which also is a leading edge detection portion considers the shadow Rs of the leading edge part Dt of the original D when the light 12al irradiated onto the front face reading position 103a of the front face opposite member 210 from the light source 12a is blocked by the original D as illustrated in FIG. 5B. The shadow Rs is detected from image data of the front face (first face) of the original D read by the front face reading portion (first reading portion) 103 as illustrated in FIG. 6A. As a result, it is detected that the leading edge part Dt of the front face of the original D reaches the front face reading portion (first reading portion) 103.

Further, the reader image processing portion (leading edge detection portion) 304 detects the shadow Rs of the leading edge part Dt of the original D from image data of the back face (second face) of the original D read by the back face reading portion (second reading portion) 213. As a result, it is detected that the leading edge part Dt of the back face of the original D reaches the back face reading portion (second reading portion) 213.

Figure 7A:
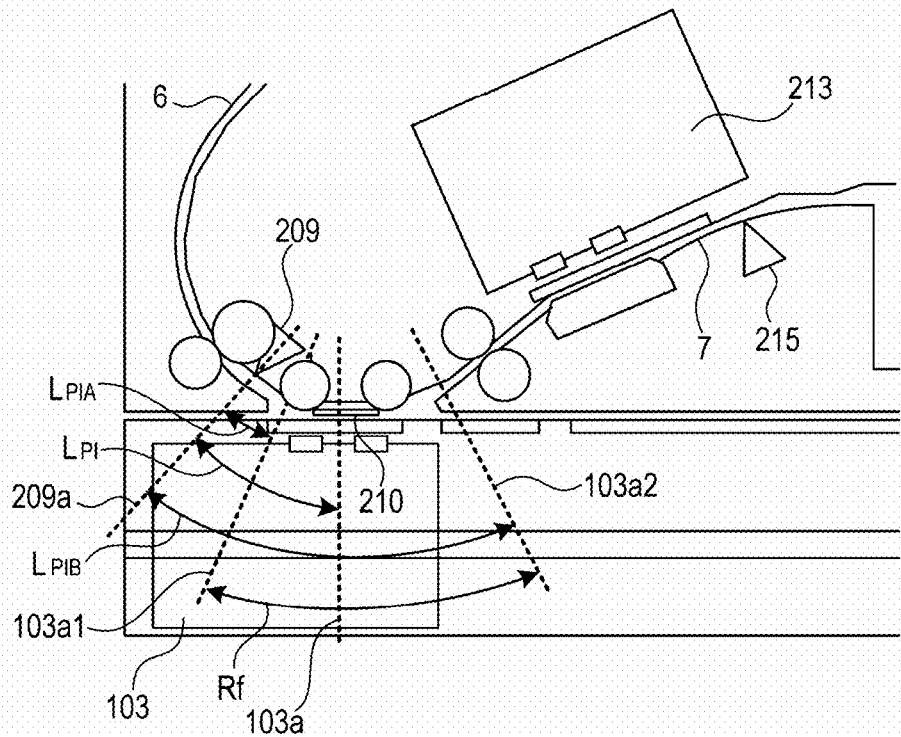
FIG. 7A is a cross-sectional diagram illustrating a processing range of detection of a leading edge of the front face of the original.

In FIG. 7A, a distance $L_{P1}$ from the detection position 209a of the lead sensor 209 on the conveyance path 6 to the front face reading position 103a of the front face reading portion 103 is illustrated. Further, a distance $L_{P1A}$ from the detection position 209a to a detection start position 103a1 of the leading edge part Dt of the front face of the original D is illustrated. Further, a distance $L_{P1B}$ from the detection position 209a to a detection termination position 103a2 of the leading edge part Dt of the front face of the original D is illustrated. Further, FIG. 7A is a cross-sectional diagram illustrating a detection range Rf of the leading edge part Dt of the front face of the original D.

Figure 7B:
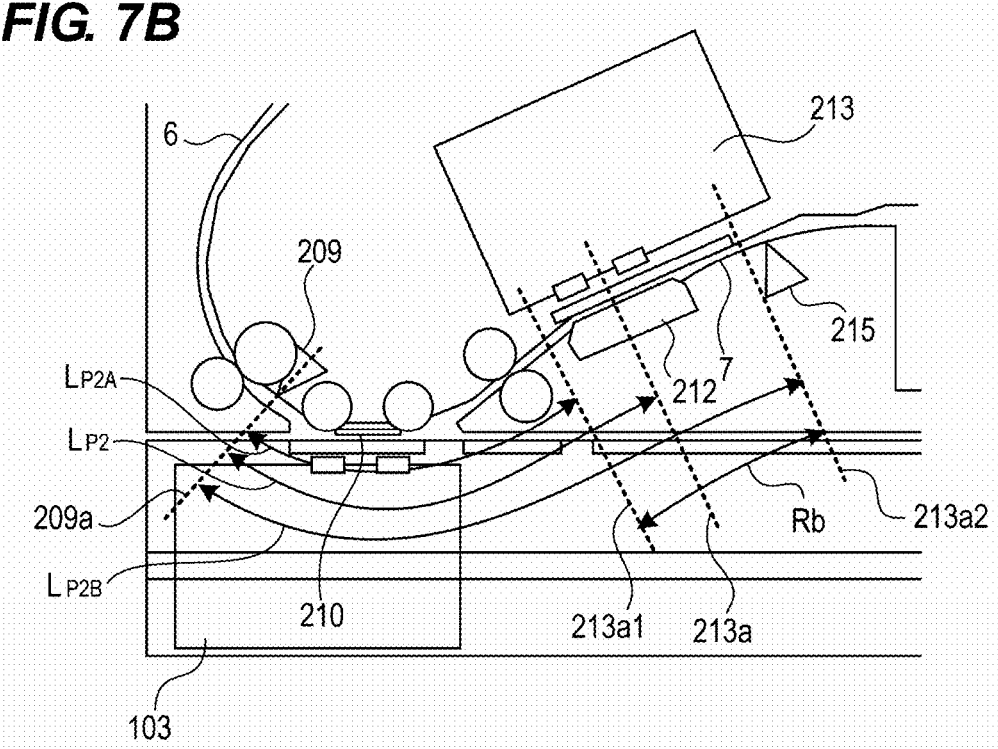
FIG. 7B is a cross-sectional diagram illustrating a processing range of detection of a leading edge of a back face of the original.

In FIG. 7B, a distance $L_{P2}$ from the detection position 209a of the lead sensor 209 on the conveyance path 6 to the back face reading position 213a of the back face reading portion 213 on the conveyance path 7 is illustrated. Further, a distance $L_{P2A}$ from the detection position 209a to a detection start position 213a1 of the leading edge part Dt of the back face of the original D is illustrated. Further, a distance $L_{P2B}$ from the detection position 209a to a detection termination position 213a2 of the leading edge part Dt of the back face of the original D is illustrated. Further, FIG. 7B is a cross-sectional diagram illustrating a detection range Rb of the leading edge part Dt of the back face of the original D.

FIG. 8A illustrates a leading edge position Ri1 of an original image area Ri on an image memory stored in the reader image memory 11 of the reader controller 300 when the detection of the leading edge parts Dt of the front and back faces of the original D succeeds. Further, FIG. 8A is a diagram illustrating a transmission start position Pt for transmission to the system image processing portion 314 of the system controller 310.

FIG. 8B illustrates a leading edge position Ri1 of an original image area Ri on an image memory stored in the reader image memory 11 of the reader controller 300 when the detection of the leading edge parts Dt of the front and back faces of the original D fails. Further, FIG. 8B is a diagram illustrating a transmission start position Pt for transmission to the system image processing portion 314 of the system controller 310.

In step S110 of FIG. 4A, the reader CPU 301 considers a time when the leading edge part Dt of the original D passes through the lead sensor 209 and the lead sensor 209 is turned on from the turn-off state. As a result, the conveyance distance $L_{X1}$ of the leading edge part Dt of the front face of the original D based on the detection position 209a of the lead sensor 209 on the conveyance path 6, is monitored. Then, the reader CPU 301 waits until the leading edge part Dt of the front face of the original D reaches the detection start position 103a1 of the leading edge part Dt of the front face of the original D illustrated in FIG. 7A.

Here, the reader CPU 301 considers the conveyance distance $L_{X1}$ of the leading edge part Dt of the front face of the original D based on the detection position 209a of the lead sensor 209 on the conveyance path 6. Further, the reader CPU 301 considers the distance $L_{P1A}$ from the detection position 209a of the lead sensor 209 to the detection start position 103a1 of the leading edge part Dt of the front face of the original D.

In step S110, the conveyance distance $L_{X1}$ of the leading edge part Dt of the front face of the original D becomes equal to or more than the distance $L_{P1A}$ illustrated in FIG. 7A. At this time, the reader CPU 301 determines that the leading edge part Dt of the front face of the original D reaches the detection start position 103a1 of the leading edge part Dt of the front face of the original D. Then, the reader CPU 301 proceeds to step S111.

In step S111, the reader CPU 301 starts reading of an image of the front face of the original D by the front face reading portion 103. The front face image of the original D read by the front face reading portion 103 is stored in the reader image memory 11 via the reader image processing portion 304 illustrated in FIG. 3. After starting the reading of the front face image of the original D, in step S112, the reader CPU 301 confirms whether or not the leading edge part Dt of the front face of the original D reaches the front face reading position 103a and is detected by the reader image processing portion 304.

In the case in which the leading edge part Dt of the front face of the original D does not yet reach the front face reading position 103a and is not detected, the reader CPU 301 proceeds to step S114. In step S114, the reader CPU 301 confirms whether or not the leading edge part Dt of the front face of the original D reaches the detection termination position 103a2 illustrated in FIG. 7A. At this time, the conveyance distance $L_{X1}$ of the leading edge part Dt of the front face of the original D becomes equal to or more than the distance $L_{P1B}$ from the detection position 209a of the lead sensor 209 to the detection termination position 103a2 of the leading edge part Dt of the front face of the original D.

At this time, the reader CPU 301 determines that the leading edge part Dt of the front face of the original D reaches the detection termination position 103a2 illustrated in FIG. 7A. Then, the reader CPU 301 proceeds to step S115. The conveyance distance $L_{X1}$ of the leading edge part Dt of the front face of the original D becomes equal to the distance $L_{P1}$ from the detection position 209a of the lead sensor 209 to the front face reading position 103a of the front face reading portion 103. At this time, the reader CPU 301 notifies the reader image processing portion 304 of a start of image transmission to the system image processing portion 314.

In step S114, the reader CPU 301 returns to step S112 in the case in which the leading edge part Dt of the front face of the original D does not reach the detection termination position 103a2 of the leading edge part Dt of the front face of the original D. Then, in step S112, the reader CPU 301 confirms again whether or not the leading edge part Dt of the front face of the original D is detected by the reader image processing portion 304.

When the plain paper original D is normally conveyed without being delayed, the leading edge part Dt of the front face of the original D is detected by the reader image processing portion 304 before the leading edge part Dt of the front face of the original D reaches the detection termination position 103a2 of the leading edge part Dt of the front face of the original D. Thereafter, the reader CPU 301 proceeds to step S113 to notify the reader image processing portion 304 of a start of image transmission to the system image processing portion 314.

At this time, the reader image processing portion 304 considers the leading edge position Ri1 of the original image area Ri of the front face image of the original D in the reader image memory 11 as a position of the detected leading edge part Dt of the front face of the original D as illustrated in FIG. 8A. Then, the reader image processing portion 304 transmits the leading edge position Ri1 to the system image processing portion 314 via the image data bus 322.

Next, the reader CPU 301 performs detection processing of the leading edge part Dt of the back face of the original D. First, in step S116, the reader CPU 301 monitors the conveyance distance $L_{X2}$ of the leading edge part Dt of the back face of the original D. Then, the reader CPU 301 waits until the leading edge part Dt of the back face of the original D reaches the detection start position 213a1 of the leading edge part Dt of the back face of the original D of the back face reading portion 213 illustrated in FIG. 7B.

At this time, the conveyance distance $L_{X2}$ of the leading edge part Dt of the back face of the original D becomes equal to or more than the distance $L_{P2A}$ from the detection position 209a of the lead sensor 209 to the detection start position 213a1 of the leading edge part Dt of the back face of the original D. At this time, the reader CPU 301 determines that the leading edge part Dt of the back face of the original D reaches the detection start position 213a1 of the back face reading portion 213 illustrated in FIG. 7B.

In step S116, when the leading edge part Dt of the back face of the original D reaches the detection start position 213a1 of the leading edge part Dt of the back face of the original D of the back face reading portion 213, the reader CPU 301 proceeds to step S117. In step S117, the reader CPU 301 starts reading of an image of the back face of the original D by the back face reading portion 213. The back face image of the original D read by the back face reading portion 213 is stored in the reader image memory 11 via the reader image processing portion 304.

Next, in step S118, the reader CPU 301 confirms whether or not the leading edge part Dt of the back face of the original D is detected by the reader image processing portion 304. In the case in which the leading edge part Dt of the back face of the original D does not yet reach the back face reading position 213a of the back face reading portion 213 and is not detected, the reader CPU 301 proceeds to step S121. In step S121, the reader CPU 301 confirms whether or not the leading edge part Dt of the back face of the original D reaches the detection termination position 213a2 of the leading edge part Dt of the back face of the original D illustrated in FIG. 7B.

At this time, the reader CPU 301 considers the conveyance distance $L_{X2}$ of the leading edge part Dt of the back face of the original D based on the detection position 209a of the lead sensor 209 on the conveyance path 6. Further, the distance $L_{P2B}$ from the detection position 209a of the lead sensor 209 disposed on the conveyance path 6 to the detection termination position 213a2 of the leading edge part Dt of the back face of the original D disposed on the conveyance path 7 illustrated in FIG. 7B, is considered. Then, it is determined whether or not the conveyance distance $L_{X2}$ of the leading edge part Dt of the back face of the original D is equal to or more than the distance $L_{P2B}$.

In step S121, the reader CPU 301 returns to step S118 in the case in which the leading edge part Dt of the back face of the original D does not reach the detection termination position 213a2 of the leading edge part Dt of the back face of the original D. In step S118, the reader CPU 301 confirms again whether or not the leading edge part Dt of the back face of the original D is detected by the reader image processing portion 304.

The plain paper original D is normally conveyed without being delayed. In this case, the leading edge part Dt of the back face of the original D is detected by the reader image processing portion 304 before reaching the detection termination position 213a2 of the leading edge part Dt of the back face of the original D, similarly to the leading edge part Dt of the front face of the original D described above.

In step S118, when the leading edge part Dt of the back face of the original D is detected by the reader image processing portion 304, the reader CPU 301 proceeds to step S119. In step S119, the reader CPU 301 notifies the reader image processing portion 304 of a start of image transmission to the system image processing portion 314.

The reader image processing portion 304 considers the leading edge position Ri1 of the original image area Ri of the back face image of the original D in the reader image memory 11 as a position of the detected leading edge part Dt of the back face of the original D as illustrated in FIG. 8A. Then, the reader image processing portion 304 transmits the leading edge position Ri1 to the system image processing portion 314 via the image data bus 322. Thereafter, the reader CPU 301 proceeds to step S120 to perform setting of a discharge delay jam margin $L_M$ of the original D.

The discharge delay jam margin $L_M$ of the original D is an allowable amount of a conveyance delay of the original D from the turn-on of the lead sensor 209 to the turn-on of the discharge sensor 215 illustrated in FIG. 2. The detection processing of the discharge delay jam of the original D in steps S134 to S137 of FIG. 4C is considered. In step S134, the reader CPU 301 detects the discharge delay jam of the original D when a conveyance delay amount ($L_{X2}-L_{P3}$) of the original D is larger than the discharge delay jam margin $L_M$ of the original D.

The larger the discharge delay jam margin $L_M$ of the original D is, the larger the allowable conveyance delay amount of the original D is. For this reason, when the discharge delay jam of the original D occurs, a section in which the jammed original D is conveyed by force becomes long. As a result, damage to the original D becomes severe, such that there is a possibility that the original D is destroyed.

In step S118, a case in which the leading edge part Dt of the back face of the plain paper original D can be detected by the reader image processing portion 304 is considered. Here, even in the case of a normal jam margin $L_{M1}$, a time required from when the discharge delay jam of the original D occurs to when the discharge delay jam of the original D is detected is short. For this reason, in step S120, the reader CPU 301 puts priority on the allowable amount of the conveyance delay of the original D over the damage to the original D and sets the normal jam margin $L_{M1}$. In step S118, when the leading edge part Dt of the back face of a thin paper original D cannot be detected by the reader image processing portion 304, the reader CPU 301 proceeds to steps S121 to S123 which will be described later.

In steps S110 to S119, the detection of the leading edge parts Dt of the front and back faces of the original D is terminated. Thereafter, the reader CPU 301 performs the detection processing of the discharge delay jam of the original D based on the discharge delay jam margin $L_{M1}$ of the original D which is set at the time of the detection of the leading edge part Dt of the back face of the original D.

<Operation of Detecting Discharge Delay Jam of Original>

In step S124, the reader CPU 301 confirms whether or not the leading edge part Dt of the back face of the original D reaches the discharge sensor 215, and the discharge sensor 215 is turned on from the turn-off state. In step S124, when the discharge sensor 215 is not turned on from the turn-off state, the reader CPU 301 proceeds to step S134.

In step S134, the reader CPU 301 considers the conveyance delay amount ($L_{X2}-L_{P3}$) of the original D from when the lead sensor 209 is turned on to when the discharge sensor 215 is turned on. Further, the reader CPU 301 confirms whether or not the conveyance delay amount ($L_{X2}-L_{P3}$) of the original D is larger than the discharge delay jam margin $L_{M1}$ of the original D.

The conveyance distance $L_{X2}$ illustrated in step S134 refers to the conveyance distance of the leading edge part Dt of the back face of the original D based on the detection position 209a of the lead sensor 209 on the conveyance path 6. The distance $L_{P3}$ refers to a distance from the detection position 209a of the lead sensor 209 to a detection position 215a of the discharge sensor 215 on the conveyance paths 6 and 7.

An interval between the turn-on of the lead sensor 209 to the turn-on of the discharge sensor 215 illustrated in FIG. 2 is considered. A value obtained by subtracting the distance $L_{P3}$ on the conveyance paths 6 and 7 from the conveyance distance $L_{X2}$ of the leading edge part Dt of the back face of the original D measured in the interval is considered. The value is the conveyance delay amount ($L_{X2}-L_{P3}$) of the original D.

When the conveyance delay amount ($L_{X2}-L_{P3}$) of the original D is equal to or smaller than the discharge delay jam margin $L_{M1}$ of the original D, the reader CPU 301 proceeds to step S124. In step S124, the reader CPU 301 confirms again whether or not the discharge sensor 215 is turned on from the turn-off state.

Figure 9A:
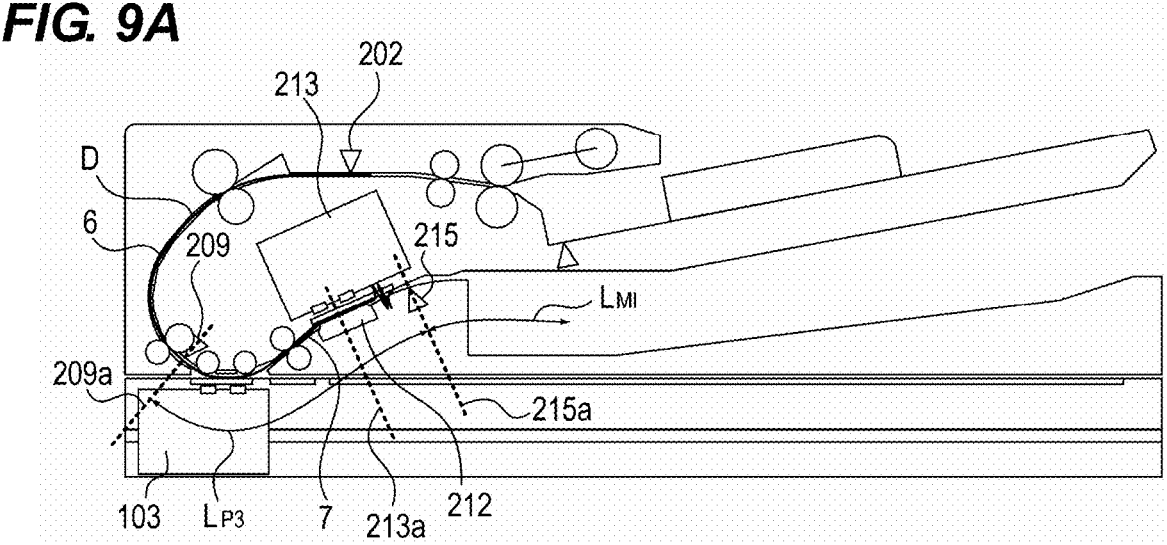
FIGS. 9A to 9C are cross-sectional diagrams illustrating jam occurring positions of the original.
Figure 9B:
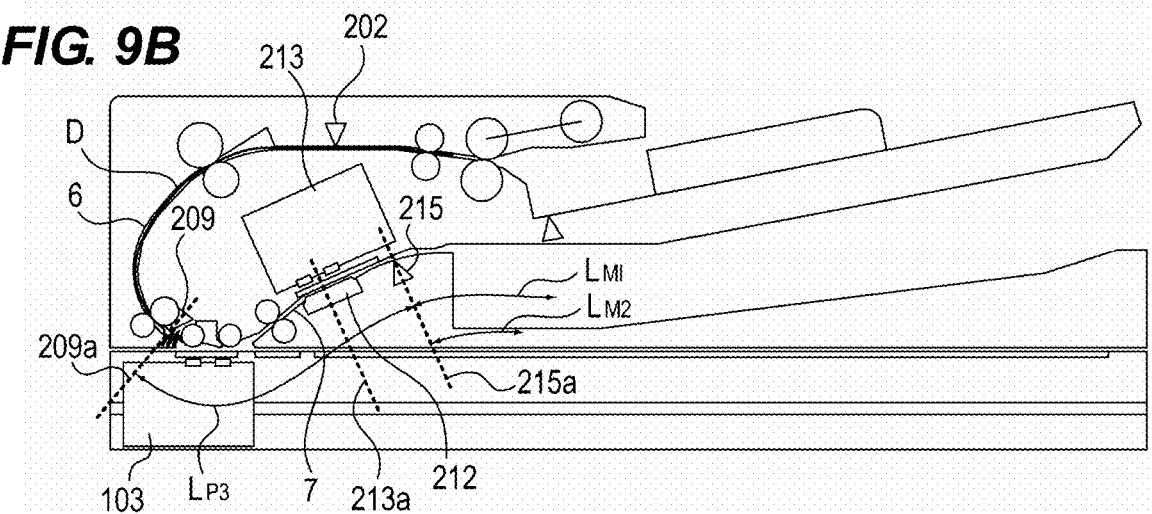
Figure 9C:
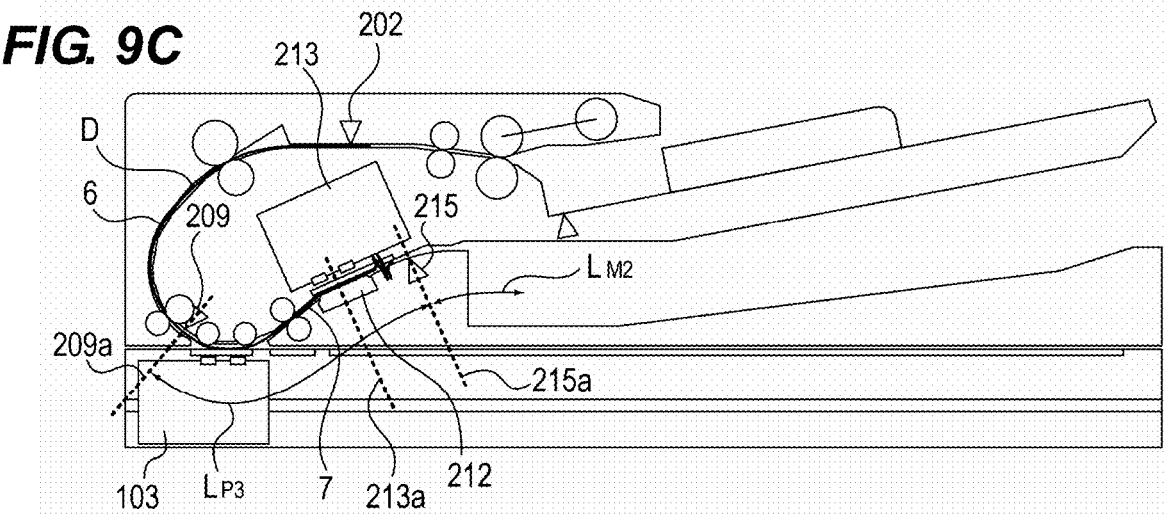

FIGS. 9A to 9C are cross-sectional diagrams illustrating jam occurring positions of the original D. As illustrated in FIG. 9A, when the leading edge part Dt of the back face of the plain paper original D is stopped due to occurrence of the jam after passing through the back face reading position 213a of the back face reading portion 213, the leading edge part Dt of the back face of the original D is detected by the detection processing of the leading edge part Dt of the back face of the original D. For this reason, the normal jam margin $L_{M1}$ is set as the discharge delay jam margin $L_M$ of the original D.

At this time, as illustrated in FIG. 9A, the leading edge part Dt of the back face of the original D does not reach the detection position 215a of the discharge sensor 215. Therefore, the conveyance delay amount ($L_{X2}-L_{P3}$) of the leading edge part Dt of the back face of the original D is larger than the jam margin $L_{M1}$. At this time, the reader CPU 301 determines that the discharge delay jam of the original D occurs, and proceeds to step S135. In step S135, all loads such as the respective motors including the separation motor 306 or the lead motor 307, the front face reading portion 103, the back face reading portion 213, or the like are stopped.

That is, the reader CPU 301 which also is a determination portion performs the conveyance of the original D by a first amount or a second amount smaller than the first amount from when the leading edge part Dt of the original D reaches the detection position 209a of the lead sensor 209 which is a reference position. When the discharge sensor (second sensor) 215 still cannot detect the reaching of the leading edge part Dt of the original D, it is determined that the delay jam of the original D occurs. The reader CPU 301 which is the controller stops the lead motor (motor) 307 when the discharge sensor (second sensor) 215 cannot detect the original D even through the conveyance of the original D is performed by the first amount from when the lead sensor (first sensor) 209 detects the original D.

Here, the first amount refers to a conveyance distance obtained by adding the normal jam margin $L_{M1}$ to the distance $L_{P3}$ from the detection position 209a of the lead sensor 209 to the detection position 215a of the discharge sensor 215 on the conveyance paths 6 and 7. At this time, the conveyance distance of the original D can be obtained from the number of driving pulses applied to each motor and the gear ratio.

Thereafter, in step S136, the reader CPU 301 notifies the system controller 310 of occurrence of the discharge delay jam of the original D, and the occurrence of the discharge delay jam of the original D is displayed for the user in the display portion (not illustrated) disposed in the operation portion 316. Then, the reader CPU 301 proceeds to step S137 to terminate the skimming control for the original D by the ADF 200.

A case in which the discharge delay jam of the plain paper original D does not occur is considered. In this case, the leading edge part Dt of the back face of the original D reaches the detection position 215a of the discharge sensor 215 before the conveyance delay amount ($L_{X2}-L_{P3}$) of the leading edge part Dt of the back face of the original D exceeds the jam margin $L_{M1}$. For this reason, the reader CPU 301 determines that the original D is normally conveyed without being delayed, and terminates the detection processing of the discharge delay jam of the original D.

<Termination Processing of Reading of Images of Front and Back Faces of Original>

After terminating the detection processing of the discharge delay jam of the original D, the reader CPU 301 performs termination processing of the reading of the images of the front and back faces of the original D. In step S125, the reader CPU 301 confirms the conveyance distance $L_{X1}$ of the leading edge part Dt of the front face of the original D based on the detection position 209a of the lead sensor 209 on the conveyance path 6.

Here, the distance $L_1$ from the detection position 209a of the lead sensor 209 to the front face reading position 103a of the front face reading portion 103 is considered. Further, the original length $L_D$ of the original D in the conveyance direction is considered. The reader CPU 301 waits until the conveyance distance $L_{X1}$ of the leading edge part Dt of the front face of the original D becomes equal to a distance obtained by adding the original length $L_D$ to the distance $L_{P1}$.

When it is confirmed that the conveyance distance $L_{X1}$ of the leading edge part Dt of the front face of the original D is equal to the distance obtained by adding the original length $L_D$ to the distance $L_1$, the reader CPU 301 proceeds to step S126. In step S126, the reader CPU 301 terminates the reading of the front face image of the original D.

Thereafter, in step S127, the reader CPU 301 again confirms the conveyance distance $L_{X2}$ of the leading edge part Dt of the back face of the original D based on the detection position 209a of the lead sensor 209 on the conveyance path 6. Then, the original length $L_D$ is added to the distance $L_{P2}$ from the detection position 209a of the lead sensor 209 to the back face reading position 213a of the back face reading portion 213. It is determined whether or not the conveyance distance $L_{X2}$ of the leading edge part Dt of the back face of the original D is equal to the distance $(L_{P2}+L_D)$.

In step S127, when it is confirmed that the conveyance distance $L_{X2}$ of the leading edge part Dt of the back face of the original D is equal to the distance $(L_{P2}+L_D)$, the reader CPU 301 proceeds to step S128. In step S128, the reader CPU 301 terminates the operation of reading the back face image of the original D.

In step S128, after terminating the operation of reading the back face image of the original D, the reader CPU 301 proceeds to step S129 to perform discharge processing of the original D. In step S129, the reader CPU 301 monitors a detection result of the discharge sensor 215 illustrated in FIG. 2, and waits until the trailing edge part Dr of the original D passes through the discharge sensor 215 and the discharge sensor 215 is turned off from the turn-on state.

In step S129, when it is detected that the discharge sensor 215 is turned off from the turn-on state, the reader CPU 301 proceeds to step S130. In step S130, the reader CPU 301 drives the lead motor 307 by a predetermined distance to completely discharge the original D onto the discharge tray 217 by the discharge roller 216, and then stops the lead motor 307, thereby completing the discharge of the original D.

Thereafter, in step S131, the reader CPU 301 confirms a detection result of the original detection sensor 202 disposed in the original tray 201, and confirms whether or not an original D that is not yet read remains on the original tray 201. In step S131, when the original detection sensor 202 is kept to be in the turn-on state, and the original D that is not yet read remains on the original tray 201, the reader CPU 301 returns to step S103 to drive the separation motor 306 again, thereby starting the feeding processing of the next original D.

In step S131, when the original detection sensor 202 is turned off and there is no original D that is not yet read on the original tray 201, the reader CPU 301 proceeds to step S132. In step S132, the reader CPU 301 determines that an image reading operation for all the originals D put on the original tray 201 is completed. Then, the reader CPU 301 stops all loads such as the respective motors, the front face reading portion 103, the back face reading portion 213, or the like, and proceeds to step S133 to terminate the skimming control for the original D by the ADF 200.

<Operation of Detecting Discharge Delay Jam when Jam Occurs Before Leading Edge Part of Back Face of Plain Paper Original Passes Through Back Face Reading Position>

Next, a control when a jam of the plain paper original D occurs in a section from the detection position 209a of the lead sensor 209 to the back face reading position 213a of the back face reading portion 213, will be described with reference to FIGS. 4A to 4C. Here, a case in which the original D is jammed right after the original D conveyed on the conveyance path 6 is detected by the lead sensor 209 and the lead sensor 209 is turned on from the turn-off state as illustrated in FIG. 9B, is considered.

The controls from the start of the skimming operation in step S101 of FIG. 4A to the start of the measurement of the conveyance distance $L_{X1}$ and $L_{X2}$ of the leading edge parts Dt of the front and back faces of the original D in step S109, are performed. The controls are the same as those when the leading edge part Dt of the back face of the original D is jammed after the leading edge part Dt of the back face of the plain paper original D passes through the back face reading position 213a of the back face reading portion 213. For this reason, the detection control of the discharge delay jam of the original D after step S110 which are different will be described.

In step S110, the reader CPU 301 performs detection processing of the leading edge part Dt of the front face of the original D. In step S110, the reader CPU 301 monitors the conveyance distance $L_{X1}$ of the leading edge part Dt of the front face of the original D based on the detection position 209a of the lead sensor 209 on the conveyance path 6. Then, the reader CPU 301 waits until the leading edge part Dt of the front face of the original D reaches the detection start position 103a1 of the leading edge part Dt of the front face of the original D.

At this time, the reader CPU 301 considers the conveyance distance $L_{X1}$ of the leading edge part Dt of the front face of the original D. Further, the reader CPU 301 considers the distance $L_{P1A}$ from the detection position 209a of the lead sensor 209 to the detection start position 103a1 of the leading edge part Dt of the front face of the original D. It is determined whether or not the conveyance distance $L_{X1}$ of the leading edge part Dt of the front face of the original D is equal to or more than the distance $L_{P1A}$.

In step S110, the reader CPU 301 proceeds to step S111 in the case in which the leading edge part Dt of the front face of the original D reaches the detection start position 103a1 of the leading edge part Dt of the front face of the original D. In step S111, the reader CPU 103 starts the reading of the front face image of the original D by the front face reading portion 103. The front face image of the original D read by the front face reading portion 103 is stored in the reader image memory 11 via the reader image processing portion 304.

As illustrated in FIG. 9B, a case in which the leading edge part Dt of the front face of the original D is jammed at an upstream of the front face reading position 103a, is considered. In this case, since the leading edge part Dt of the front face of the original D cannot reach the front face reading position 103a, the leading edge part Dt of the front face of the original D cannot be detected by the reader image processing portion (leading edge detection portion) 304 in step S112. Therefore, the reader CPU 301 proceeds to step S114. In step S114, before detecting the leading edge part Dt of the front face of the original D by the reader image processing portion 304, the leading edge part Dt of the front face of the original D reaches the detection termination position 103a2 of the leading edge part Dt of the front face of the original D.

At this time, the original D is jammed and stopped as illustrated in FIG. 9B. Here, the conveyance distance $L_{X1}$ of the leading edge part Dt of the front face of the original D based on the detection position 209a of the lead sensor 209 measured in step S109, is considered. Further, the distance $L_{P1B}$ from the detection position 209a of the lead sensor 209 to the detection termination position 103a2 of the leading edge part Dt of the front face of the original D, is considered. Then, the conveyance distance $L_{X1}$ of the leading edge part Dt of the front face of the original D becomes equal to or more than the distance $L_{P1B}$.

At this time, in step S115, the reader CPU 301 notifies the reader image processing portion 304 of a start of image transmission to the system image processing portion 314. However, the position of the leading edge part Dt of the front face of the original D cannot be detected by the reader image processing portion 304. For this reason, the reader CPU 301 considers a memory page leading edge position Ps (image data leading edge position) as illustrated in FIG. 8B.

The transmission start position Pt which is apart from the memory page leading edge position Ps toward the original image area Ri side by a distance ($L_{P1}$-$L_{P1A}$) between the detection start position 103a1 of the leading edge part Dt of the front face of the original D and the front face reading position 103a, is considered. The transmission start position Pt is transmitted as the leading edge part Dt of the front face of the original D to the system image processing portion 314 via the image data bus 322.

Next, the reader CPU 301 proceeds to step S116 to perform the detection processing of the leading edge part Dt of the back face of the original D. In step S116, the reader CPU 301 monitors the conveyance distance $L_{X2}$ of the leading edge part Dt of the back face of the original D based on the detection position 209a of the lead sensor 209 on the conveyance path 6. Then, the reader CPU 301 waits until the leading edge part Dt of the back face of the original D reaches the detection start position 213a1 of the leading edge part Dt of the back face of the original D of the back face reading portion 213.

At this time, the reader CPU 301 considers the conveyance distance $L_{X2}$ of the leading edge part Dt of the back face of the original D. Further, the reader CPU 301 considers the distance $L_{P2A}$ from the detection position 209a of the lead sensor 209 to the detection start position 213a1 of the leading edge part Dt of the back face of the original D. Then, it is determined whether or not the conveyance distance $L_{X2}$ of the leading edge part Dt of the back face of the original D is equal to or more than the distance $L_{P2A}$.

In step S116, the leading edge part Dt of the back face of the original D reaches the detection start position 213a1 of the leading edge part Dt of the back face of the original D of the back face reading portion 213. Then, the reader CPU 301 proceeds to step S117 to start the operation of reading the back face image of the original D by the back face reading portion 213. The back face image of the original D read by the back face reading portion 213 is stored in the reader image memory 11 via the reader image processing portion 304 illustrated in FIG. 3.

As illustrated in FIG. 9B, when the leading edge part Dt of the back face of the original D is jammed at an upstream of the front face reading position 103a, the leading edge part Dt of the back face of the original D cannot reach the back face reading position 213a of the back face reading portion 213. For this reason, in step S118, the leading edge part Dt of the back face of the original D cannot be detected, and the reader CPU 301 proceeds to step S121.

In step S118, a state before the leading edge part Dt of the back face of the original D is detected by the reader image processing portion 304 is considered. At this time, in step S121, the reader CPU 301 considers the conveyance distance $L_{X2}$ of the leading edge part Dt of the back face of the original D based on the detection position 209a of the lead sensor 209 on the conveyance path 6.

Then, the leading edge part Dt of the back face of the original D reaches the detection termination position 213a2 of the leading edge part Dt of the back face of the original D illustrated in FIG. 7B. At this time, the conveyance distance $L_{X2}$ of the leading edge part Dt of the back face of the original D becomes equal to or more than the distance $L_{P2B}$ from the detection position 209a of the lead sensor 209 to the detection termination position 213a2 of the leading edge part Dt of the back face of the original D.

In step S118, when the leading edge part Dt of the back face of the original D cannot be detected by the reader image processing portion 304, the reader CPU 301 proceeds to steps S121 to S122. In step S122, the reader CPU 301 notifies the reader image processing portion 304 illustrated in FIG. 3 of a start of image transmission to the system image processing portion 314. At this time, the reader image processing portion 304 cannot detect a position of the leading edge part Dt of the back face of the original D.

For this reason, the reader CPU 301 considers the memory page leading edge position Ps (image data leading edge position) as illustrated in FIG. 8B. The transmission start position Pt which is apart from the memory page leading edge position Ps toward the original image area Ri side by a distance ($L_{P2}$-$L_{P2A}$) between the detection start position 213a1 of the leading edge part Dt of the back face of the original D and the back face reading position 213a, is considered. The transmission start position Pt is transmitted as the leading edge part Dt of the back face of the original D to the system image processing portion 314 via the image data bus 322.

Thereafter, the reader CPU 301 determines that there is a possibility that the original D is jammed and stopped at an upstream of the back face reading portion 213. Then, in step S123, the reader CPU 301 sets the discharge delay jam margin $L_M$ of the original D. At this time, a jam margin $L_{M2}$ which is smaller than the normal jam margin $L_{M1}$ set in step S120 is set.

In step S112 and step S118, the detection of the leading edge parts Dt of the front and back faces of the original D is terminated. Thereafter, the reader CPU 301 considers the discharge delay jam margins $L_{M1}$ and $L_{M2}$ of the original D which are set at the time of the detection of the leading edge part Dt of the back face of the original D in step S120 and step S123. Then, the reader CPU 301 proceeds to step S124 to perform the detection processing of the discharge delay jam of the original D based on the discharge delay jam margins $L_{M1}$ and $L_{M2}$ of the original D.

In step S124, the reader CPU 301 confirms whether or not the leading edge part Dt of the back face of the original D reaches the discharge sensor 215, and the discharge sensor 215 is turned on from the turn-off state. In step S124, when the discharge sensor 215 is not turned on from the turn-off state, the reader CPU 301 proceeds to step S134.

In step S134, the reader CPU 301 considers the conveyance delay amount ($L_{X2}$-$L_{P3}$) of the original D from when the lead sensor 209 is turned on to when the discharge sensor 215 is turned on. The reader CPU 301 confirms whether or not the conveyance delay amount ($L_{X2}-L_{P3}$) of the original D is larger than the normal discharge delay jam margin $L_{M1}$ of the original D.

At this time, the reader CPU 301 considers the conveyance distance $L_{X2}$ of the leading edge part Dt of the back face of the original D based on the detection position 209a of the lead sensor 209 on the conveyance path 6. Further, the distance $L_{P3}$ from the detection position 209a of the lead sensor 209 to the detection position 215a of the discharge sensor 215 is considered.

Further, the conveyance delay amount ($L_{X2}-L_{P3}$) of the original D obtained by subtracting the distance $L_{P3}$ from the conveyance distance $L_{X2}$, is considered. The reader CPU 301 determines whether or not the conveyance delay amount ($L_{X2}-L_{P3}$) of the original D is larger than the normal discharge delay jam margin $L_{M1}$. The conveyance delay amount ($L_{X2}-L_{P3}$) of the original D is equal to or smaller than the discharge delay jam margin $L_{M1}$ of the original D. At this time, the reader CPU 301 returns to step S124 to confirm again whether or not the discharge sensor 215 is turned on from the turn-off state.

As illustrated in FIG. 9B, a case in which the leading edge part Dt of the back face of the plain paper original D is stopped due to occurrence of a jam, before the leading edge part Dt of the back face of the original D passes through the back face reading position 213a of the back face reading portion 213, is considered. In this case, in the detection processing of the leading edge part Dt of the back face of the original D in step S118, the reader image processing portion 304 cannot detect the leading edge part Dt of the back face of the original D. For this reason, in step S123 after step S121 and step S122, the discharge delay jam margin $L_M$ of the original D is set. At this time, the jam margin $L_{M2}$ which is smaller than the normal jam margin $L_{M1}$ set in step S120 is set.

The leading edge part Dt of the back face of the original D that is stopped due to the occurrence of the jam does not reach the discharge sensor 215. For this reason, in step S124, the discharge sensor 215 is not turned on from the turn-off state. In step S134, when the conveyance delay amount ($L_{X2}-L_{P3}$) of the original D is larger than the jam margin $L_{M2}$ ($<L_{M1}$), the reader CPU 301 proceeds to step S135. In step S135, the reader CPU 301 determines that the discharge delay jam occurs and stops all loads such as the respective motors, the front face reading portion 103, the back face reading portion 213, or the like.

The reader CPU (controller) 301 considers a case in which the reader image processing portion (leading edge detection portion) 304 cannot detect the leading edge part Dt of the original D from the image data of the back face (second face) of the original D. In this case, the jam margin $L_{M2}$ (third jam margin) which is smaller than the normal jam margin $L_{M1}$ is considered. Then, the original D is conveyed so that the leading edge part Dt of the original D only reaches the jam margin $L_{M2}$ at a downstream of the discharge sensor (second sensor) 215 in the conveyance direction of the original D. When the discharge sensor 215 still cannot detect the reaching of the leading edge part Dt of the original D, it is determined that the delay jam of the original D occurs.

That is, the reader CPU (controller) 301 considers the case in which the reader image processing portion (leading edge detection portion) 304 cannot detect the leading edge part Dt of the original D from the image data of the back face (second face) of the original D. At this time, the reader CPU 301 considers the first amount ($L_{P3}+L_{M1}$) from when the leading edge part Dt of the original D reaches the detection position (reference position) 209a of the lead sensor 209.

The original D is conveyed by a third amount ($L_{P3}+L_{M2}$) which is smaller than the first amount ($L_{P3}+L_{M1}$). When the discharge sensor 215 still cannot detect the reaching of the leading edge part Dt of the original D, it is determined that the delay jam of the original D occurs.

The reader CPU (controller) 301 considers the case in which the reader image processing portion (leading edge detection portion) 304 cannot detect the leading edge part Dt of the original D from the image data of the back face (second face) of the original D. When the leading edge part Dt of the original D cannot be detected, a case in which the original D is conveyed by the third amount which is smaller than the first amount from when the lead sensor (first sensor) 209 detects the original D, is considered.

Here, the first amount is $L_{P3}+L_{M1}$. The third amount is $L_{P3}+L_{M2}$. Then, when the discharge sensor (second sensor) 215 cannot detect the reaching of the leading edge part Dt of the original D even though the original D is conveyed, the reader CPU (controller) 301 stops the lead motor (motor) 307.

The reader CPU (controller) 301 considers the case in which the reader image processing portion (leading edge detection portion) 304 cannot detect the leading edge part Dt of the original D from the image data of the front face (first face) of the original D. At this time, the jam margin $L_{M2}$ (second jam margin) which is smaller than the normal jam margin $L_{M1}$ is considered. Then, the original D is conveyed so that the leading edge part Dt of the original D only reaches the jam margin $L_{M2}$ at a downstream of the discharge sensor (second sensor) 215 in the conveyance direction of the original D. When the discharge sensor 215 still cannot detect the reaching of the leading edge part Dt of the original D, it can be determined that the delay jam of the original D occurs.

That is, the reader CPU (controller) 301 considers a case in which the reader image processing portion (leading edge detection portion) 304 cannot detect the leading edge part Dt of the original D from the image data of the front face (first face) of the original D. At this time, the reader CPU 301 considers the first amount ($L_{P3}+L_{M1}$) from when the leading edge part Dt of the original D reaches the detection position (reference position) 209a of the lead sensor 209. Here, when the reader image processing portion (leading edge detection portion) 304 can detect the leading edge part Dt of the original D from the image data of the front face (first face) of the original D, the first amount ($L_{P3}+L_{M1}$) is set. On the other hand, when the reader image processing portion (leading edge detection portion) 304 cannot detect the leading edge part Dt of the original D from the image data of the front face (first face) of the original D, the second amount ($L_{P3}+L_{M2}$) is set.

The original D is conveyed by the second amount ($L_{P3}+L_{M2}$) which is smaller than the first amount ($L_{P3}+L_{M1}$). When the discharge sensor 215 still cannot detect the reaching of the leading edge part Dt of the original D, it can be determined that the delay jam of the original D occurs.

The reader CPU (controller) 301 considers the case in which the reader image processing portion (leading edge detection portion) 304 cannot detect the leading edge part Dt of the original D from the image data of the first face of the original D. When the leading edge part Dt of the original D cannot be detected, a case in which the original D is conveyed by the second amount which is smaller than the first amount from when the lead sensor (first sensor) 209 detects the original D, is considered.

Here, the first amount is $L_{P3}+L_{M1}$. The second amount is $L_{P3}+L_{M2}$. Then, when the discharge sensor (second sensor) 215 cannot detect the reaching of the leading edge part Dt of the original D even though the original D is conveyed, the reader CPU (controller) 301 stops the lead motor (motor) 307.

According to the present embodiment, when the reader image processing portion (leading edge detection portion) 304 cannot detect the leading edge part Dt of the original D from the image data of the front and back faces (first and second faces) of the original D, the second and third jam margins are set, respectively. The second and third jam margins are the jam margin $L_{M2}$ which is smaller than the normal jam margin $L_{M1}$. Besides, the second and third jam margins may be set to different values from each other at the front and back faces (first and second faces) of the original D. Thereafter, the reader CPU 301 proceeds to step S136 to notify the system controller 310 of occurrence of the jam, and proceeds to step S137 to terminate the operation of skimming the original D by the ADF 200.

It is to be noted that a case in which the detection position 209a of the lead sensor (first sensor) 209 is set as the reference position for measuring the first to third amounts described above has been exemplified in the present embodiment. Besides, a position at an upstream of the discharge sensor (second sensor) 215 on the conveyance paths 6 and 7 can also be appropriately set as the reference position for measuring the first to third amounts described above. Further, a case in which the conveyance distance of the original D on the conveyance paths 6 and 7 is obtained from the number of driving pulses applied to each motor from a point in time at which the leading edge part Dt of the original D reaches the reference position and the gear ratio of a gear train which is a driving force transmitting portion, and the like, has been exemplified in the present embodiment. Besides, the conveyance distance of the original D on the conveyance paths 6 and 7 can also be obtained based on a time counted by a timer from a point in time at which the leading edge part Dt of the original D reaches the reference position.

Figure 10:
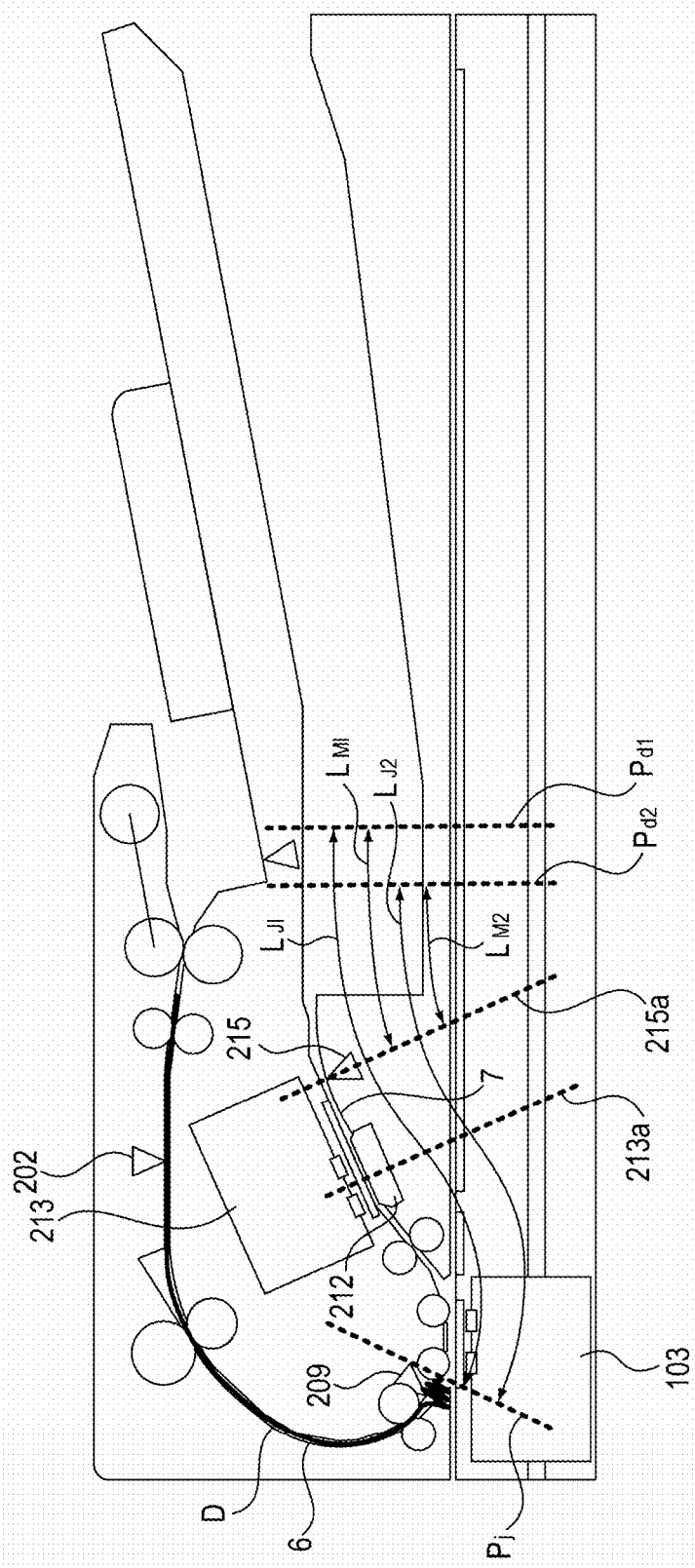
FIG. 10 is a cross-sectional diagram illustrating a conveyance distance from a position where a jam of the original occurs to a position where the jam of the original is detected.

In FIG. 10, jam detection is performed based on the normal jam margin $L_{M1}$ from a position Pj at which the jam of the original D occurs. A conveyance distance $L_{J1}$ of the original D from the position Pj at which the jam of the original D occurs to a position $P_{d1}$ at which the jam of the original D is detected, is illustrated. Further, the jam detection is performed based on the jam margin $L_{M2}$ which is smaller than the normal jam margin $L_{M1}$. A conveyance distance $L_{J2}$ of the original D from the position Pj at which the jam of the original D occurs to a position $P_{d2}$ at which the jam of the original D is detected, is illustrated.

The conveyance distances $L_{J1}$ and $L_{J2}$ of the original D illustrated in FIG. 10 refer to a distance by which the original D is conveyed again after a stop when the original D is stopped due to occurrence of the jam of the leading edge part Dt of the original D at the position Pj at an upstream of the back face reading position 213a. A distance between the lead sensor 209 and the discharge sensor 215 on the conveyance paths 6 and 7 is long. Therefore, when the jam of the original D is detected based on the normal jam margin $L_{M1}$ set in step S120, the conveyance distance $L_{J1}$ of the original D from when the jam of the original D occurs is increased.

On the contrary, in step S118, when the reader image processing portion 304 cannot detect the leading edge part Dt of the back face of the original D, the reader CPU 301 determines that the jam of the original D occurs at an upstream of the back face reading position 213a of the back face reading portion 213. Then, in step S123, the jam margin $L_{M2}$ which is smaller than the normal jam margin $L_{M1}$ is set as the jam margin $L_M$.

As illustrated in FIG. 10, the jam detection is performed based on the jam margin $L_{M2}$ which is smaller than the normal jam margin $L_{M1}$. At this time, the conveyance distance $L_{J2}$ of the original D from the position Pj at which the jam of the original D occurs to the position $P_{d2}$ at which the jam of the original D is detected, is considered.

The conveyance distance $L_{J2}$ of the original D becomes shorter than the conveyance distance $L_{J1}$ of the original D when the jam detection is performed based on the normal jam margin $L_{M1}$. As a result, damage to the original D that is jammed at an upstream of the back face reading position 213a can be controlled to the same level as that of damage to the original D that is jammed at a downstream of the back face reading position 213a.

<Operation of Detecting Discharge Delay Jam when Jam Occurs Before Leading Edge Part of Back Face of Thin Paper Original Passes Through Back Face Reading Position>

FIG. 9C illustrates a situation in which the jam of the thin paper original D occurs at an upstream of the discharge sensor 215 after the back face image is read by the back face reading portion 213. A start of the skimming by the ADF 200 in step S101 of FIG. 4A is considered. Further, a control for the start of measurement of the conveyance distance $L_{X1}$ of the leading edge part Dt of the front face of the original D based on the detection position 209a of the lead sensor 209 on the conveyance path 6 in step S108 and step S109, is considered.

The control is the same as that in the case in which the original length $L_D$ of the original D in the conveyance direction is shorter than the distance between the original detection sensor 202 and the lead sensor 209 on the conveyance path 6. For this reason, operations after the detection control of the leading edge part Dt of the original D in step S110 which are different will be described.

As illustrated in FIG. 5C, the leading edge part Dt of the front face of the thin paper original D reaches a position just in front of the front face reading position 103a at an upstream of the front face reading position 103a. Then, the light 12a1 irradiated onto the front face reading position 103a of the front face opposite member 210 from the light source 12a of an introduction side of the original D, is blocked by the original D. As a result, a shadow Rs of the leading edge part Dt of the front face of the original D is projected on the front face opposite member 210.

When a thickness of the original D is small like the thin paper illustrated in FIG. 5C, the shadow Rs of the leading edge part Dt of the front face of the original D projected on the front face opposite member 210 becomes small. For this reason, the shade Rs of the leading edge part Dt of the front face of the original D becomes thin on the original image read by the front face reading portion 103 as illustrated in FIG. 6B. When a width of the shadow Rs is smaller than one pixel, the shadow Rs cannot be read as an image.

The reader image processing portion 304 detects the leading edge part Dt of the front face of the original D by detecting the shadow Rs of the leading edge part Dt of the front face of the original D in the original image read by the front face reading portion 103. Therefore, as illustrated in FIG. 6B, in the case of the thin paper original D of which the width of the shadow Rs of the leading edge part Dt of the front face of the original D is smaller than one pixel, there is a case in which the leading edge part Dt of the front face of the original D cannot be detected.

In step S110 of FIG. 4A, the reader CPU 301 performs detection processing of the leading edge part Dt of the front face of the original D. At this time, the reader CPU 301 monitors the conveyance distance $L_{X1}$ of the leading edge part Dt of the front face of the original D based on the detection position 209a of the lead sensor 209 on the conveyance path 6. Then, the reader CPU 301 waits until the leading edge part Dt of the front face of the original D reaches the detection start position 103a1 of the leading edge part Dt of the front face of the original D illustrated in FIG. 7A.

At this time, the reader CPU 301 considers the conveyance distance $L_{X1}$ of the leading edge part Dt of the front face of the original D based on the detection position 209a of the lead sensor 209 on the conveyance path 6. Further, the reader CPU 301 considers the distance $L_{P1A}$ from the detection position 209a of the lead sensor 209 to the detection start position 103a1 of the leading edge part Dt of the front face of the original D. Then, it is determined whether or not the conveyance distance $L_{X1}$ of the leading edge part Dt of the front face of the original D is equal to or more than the distance $L_{P1A}$.

In step S110, the reader CPU 301 proceeds to step S111 in the case in which the leading edge part Dt of the front face of the original D reaches the detection start position 103a1 of the leading edge part Dt of the front face of the original D. In step S111, the reader CPU 103 starts the reading of the front face image of the original D by the front face reading portion 103. At this time, the front face image of the original D read by the front face reading portion 103 is stored in the reader image memory 11 via the reader image processing portion 304.

In the case of the thin paper original D, even when the leading edge part Dt of the front face of the original D reaches the front face reading position 103a, the shadow Rs of the leading edge part Dt of the front face of the original D is not clearly cast. Therefore, in step S112, the reader image processing portion 304 cannot detect the leading edge part Dt of the front face of the original D, and the reader CPU 301 proceeds to step S114. In step S114, the conveyance distance $L_{X1}$ of the leading edge part Dt of the front face of the original D reaches the detection termination position 103a2 of the leading edge part Dt of the front face of the original D. At this time, the conveyance distance $L_{X1}$ of the leading edge part Dt of the front face of the original D becomes equal to or more than the distance $L_{P1B}$ from the detection position 209a of the lead sensor 209 to the detection termination position 103a2 of the leading edge part Dt of the front face of the original D.

Then, the reader CPU 301 proceeds to step S115 to notify the reader image processing portion 304 illustrated in FIG. 3 of a start of image transmission to the system image processing portion 314. At this time, since the shadow Rs of the leading edge part Dt of the front face of the thin paper original D is not clearly cast, the reader image processing portion 304 cannot detect a position of the leading edge part Dt of the front face of the original D.

For this reason, the reader CPU 301 considers the memory page leading edge position Ps (image data leading edge position) as illustrated in FIG. 8B. The transmission start position Pt which is apart from the memory page leading edge position Ps toward the original image area Ri side by a distance ($L_{P1}-L_{P1A}$) between the detection start position 103a1 of the leading edge part Dt of the front face of the original D and the front face reading position 103a, is considered. The transmission start position Pt is transmitted as the leading edge part Dt of the front face of the original D to the system image processing portion 314 via the image data bus 322.

Next, in step S116, the reader CPU 301 performs the detection processing of the leading edge part Dt of the back face of the original D. In step S116, the reader CPU 301 monitors the conveyance distance $L_{X2}$ of the leading edge part Dt of the back face of the original D based on the detection position 209a of the lead sensor 209 on the conveyance path 6. Then, the reader CPU 301 waits until the leading edge part Dt of the back face of the original D reaches the detection start position 213a1 of the leading edge part Dt of the back face of the original D of the back face reading portion 213.

At this time, the reader CPU 301 considers the conveyance distance $L_{X2}$ of the leading edge part Dt of the back face of the original D based on the detection position 209a of the lead sensor 209 on the conveyance path 6. Further, the reader CPU 301 considers the distance $L_{P2A}$ from the detection position 209a of the lead sensor 209 to the detection start position 213a1 of the leading edge part Dt of the back face of the original D. Then, it is determined that the conveyance distance $L_{X2}$ of the leading edge part Dt of the back face of the original D is equal to or more than the distance $L_{P2A}$.

The reader CPU 301 proceeds to step S117 when the leading edge part Dt of the back face of the original D reaches the detection start position 213a1 of the leading edge part Dt of the back face of the original D of the back face reading portion 213. In step S117, the reader CPU 301 starts reading of the back face image of the original D by the back face reading portion 213. At this time, the back face image of the original D read by the back face reading portion 213 is stored in the reader image memory 11 via the reader image processing portion 304 illustrated in FIG. 3.

Similarly to FIG. 5C, in the case of the thin paper original D, even when the leading edge part Dt of the back face of the original D reaches the back face reading position 213a of the back face reading portion 213, the shadow Rs of the leading edge part Dt of the back face of the original D is not clearly cast. Therefore, in step S118, the reader image processing portion 304 cannot detect the leading edge part Dt of the back face of the original D. For this reason, the reader CPU 301 proceeds to step S121, and the conveyance distance $L_{X2}$ of the leading edge part Dt of the back face of the original D based on the detection position 209a of the lead sensor 209 on the conveyance path 6 reaches the detection termination position 213a2 of the leading edge part Dt of the back face of the original D.

At this time, the reader CPU 301 considers the conveyance distance $L_{X2}$ of the leading edge part Dt of the back face of the original D based on the detection position 209a of the lead sensor 209 on the conveyance path 6. Further, the reader CPU 301 considers the distance $L_{P2B}$ from the detection position 209a of the lead sensor 209 to the detection termination position 213a2 of the leading edge part Dt of the back face of the original D. Then, it is determined that the conveyance distance $L_{X2}$ of the leading edge part Dt of the back face of the original D is equal to or more than the distance $L_{P2B}$.

At this time, the reader CPU 301 notifies the reader image processing portion 304 of a start of image transmission to the system image processing portion 314. At this time, since the shadow Rs of the leading edge part Dt of the back face of the thin paper original D is not clearly cast, the reader image processing portion 304 cannot detect a position of the leading edge part Dt of the back face of the original D.

For this reason, the reader CPU 301 considers the memory page leading edge position Ps (image data leading edge position) as illustrated in FIG. 8B in step S122. The transmission start position Pt which is apart from the memory page leading edge position Ps toward the original image area Ri side by a distance ($L_{P2}$–$L_{P2A}$) between the detection start position 213a1 of the leading edge part Dt of the back face of the original D and the back face reading position 213a, is considered. The transmission start position Pt is transmitted as the leading edge part Dt of the back face of the original D to the system image processing portion 314 via the image data bus 322.

Thereafter, the reader CPU 301 determines that there is a possibility that the original D is stopped due to occurrence of the jam at an upstream of the back face reading portion 213. Then, in step S123, the jam margin $L_{M2}$ which is smaller than the normal jam margin $L_{M1}$ is set as the discharge delay jam margin $L_M$ of the original D.

The detection of the leading edge parts Dt of the front and back faces of the original D illustrated in steps S110 to S123 is terminated. Thereafter, the reader CPU 301 performs the detection processing of the discharge delay jam of the original D based on the discharge delay jam margins $L_{M1}$ and $L_{M2}$ of the original D which are set at the time of the detection of the leading edge part Dt of the back face of the original D.

In step S124 of FIG. 4C, the reader CPU 301 confirms whether or not the leading edge part Dt of the back face of the original D reaches the discharge sensor 215, and the discharge sensor 215 is turned on from the turn-off state. In step S124, when the discharge sensor 215 is not turned on from the turn-off state, the reader CPU 301 proceeds to step S134.

In step S134, the reader CPU 301 considers the conveyance distance $L_{X2}$ of the leading edge part Dt of the back face of the original D based on the detection position 209a of the lead sensor 209 on the conveyance path 6. Further, the distance $L_{P3}$ from the detection position 209a of the lead sensor 209 to the detection position 215a of the discharge sensor 215 is considered.

Further, the conveyance delay amount ($L_{X2}$–$L_{P3}$) of the original D obtained by subtracting the distance $L_{P3}$ from the conveyance distance $L_{X2}$ of the leading edge part Dt of the back face of the original D is considered. The reader CPU 301 confirms whether or not the conveyance delay amount ($L_{X2}$–$L_{P3}$) of the original D is larger than the jam margin $L_{M2}$ set in step S123.

In step S134, when the conveyance delay amount ($L_{X2}$–$L_{P3}$) of the original D is equal to or smaller than the jam margin $L_{M2}$, the reader CPU 301 proceeds to step S124. In step S124, the reader CPU 301 confirms again whether or not the discharge sensor 215 is turned on from the turn-off state.

That is, in step S134, the reader CPU 301 considers the conveyance distance $L_{X2}$ of the leading edge part Dt of the back face of the original D based on the detection position 209a of the lead sensor 209 on the conveyance path 6. Further, a distance obtained by adding the jam margin $L_{M2}$ to the distance $L_{P3}$ from the detection position 209a of the lead sensor 209 to the detection position 215a of the discharge sensor 215 is considered. Then, the reader CPU 301 confirms whether or not the conveyance distance $L_{X2}$ of the leading edge part Dt of the back face of the original D is equal to or more than the distance ($L_{P3}$+$L_{M2}$) obtained by the addition.

As illustrated in FIG. 9C, when the leading edge part Dt of the back face of the thin paper original D is stopped due to occurrence of the jam after passing through the back face reading position 213a of the back face reading portion 213, the leading edge part Dt of the back face of the thin paper original D passes through the back face reading position 213a of the back face reading portion 213. At this time, in the detection processing of the leading edge part Dt of the back face of the original D, since the shadow Rs of the leading edge part Dt of the back face of the thin paper original D is not clearly cast, the reader image processing portion 304 cannot detect a position of the leading edge part Dt of the back face of the original D.

For this reason, the jam margin $L_{M2}$ which is smaller than the normal jam margin $L_{M1}$ is set as the discharge delay jam margin $L_M$ of the original D. Since the leading edge part Dt of the back face of the thin paper original D is stopped due to occurrence of the jam after passing through the back face reading position 213a of the back face reading portion 213, the leading edge part Dt of the back face of the original D does not reach the discharge sensor 215.

Therefore, in step S134, the conveyance delay amount ($L_{X2}$–$L_{P3}$) of the leading edge part Dt of the back face of the thin paper original D is larger than the jam margin $L_{M2}$. At this time, the reader CPU 301 determines that the discharge delay jam occurs, and proceeds to step S135.

In step S135, the reader CPU 301 stops all loads such as the respective motors, the front face reading portion 103, the back face reading portion 213, or the like. Thereafter, in step S136, the reader CPU 301 notifies the system controller 310 of occurrence of the jam of the thin paper original D, and the occurrence of the jam of the thin paper original D is informed to the user in the display portion (not illustrated) disposed in the operation portion 316. Then, in step S137, the reader CPU 301 terminates the skimming control for the original D by the ADF 200.

A case in which the jam of the thin paper original D does not occur is considered. In this case, in step S134, the conveyance delay amount ($L_{X2}$–$L_{P3}$) of the leading edge part Dt of the back face of the thin paper original D is considered. The leading edge part Dt of the back face of the thin paper original D reaches the discharge sensor 215 in step S124 before the conveyance delay amount ($L_{X2}$–$L_{P3}$) of the original D exceeds the jam margin $L_{M2}$.

As a result, the reader CPU 301 determines that the thin paper original D of which the leading edge part Dt of the back face of the original D cannot be detected by the reader image processing portion 304 is normally conveyed without being delayed, and terminates the detection processing of the discharge delay jam of the original D. As a result, it is possible to prevent misdetection of the jam of the thin paper original D normally conveyed without being delayed.

After terminating the detection processing of the discharge delay jam of the original D, the reader CPU 301 proceeds to step S125 to perform termination processing of the reading of the images of the front and back faces of the original D. In step S125, the reader CPU 301 confirms the conveyance distance $L_{X1}$ of the leading edge part Dt of the front face of the original D based on the detection position 209a of the lead sensor 209 on the conveyance path 6.

Then, the reader CPU 301 considers the conveyance distance $L_{X1}$ of the leading edge part Dt of the front face of the original D. Further, a distance obtained by adding the original length $L_D$ of the original D in the conveyance direction to the distance $L_{P1}$ from the detection position 209a of the lead sensor 209 to the front face reading position 103a of the front face reading portion 103 is considered. Then, the reader CPU 301 waits until the conveyance distance $L_{X1}$ of the leading edge part Dt of the front face of the original D becomes equal to the distance $(L_{P1}+L_D)$ obtained by the addition.

In step S125, the reader CPU 301 confirms that the conveyance distance $L_{X1}$ of the leading edge part Dt of the front face of the original D is equal to the distance $(L_{P1}+L_D)$ obtained by the addition. Then, the reader CPU 301 proceeds to step S126 to terminate the operation of reading the front face image of the original D by the front face reading portion 103. Thereafter, in step S127, the reader CPU 301 again confirms the conveyance distance $L_{X2}$ of the leading edge part Dt of the back face of the original D based on the detection position 209a of the lead sensor 209 on the conveyance path 6.

The reader CPU 301 considers the conveyance distance $L_{X2}$ of the leading edge part Dt of the back face of the original D. Further, the distance $L_{P2}$ from the detection position 209a of the lead sensor 209 to the back face reading position 213a of the back face reading portion 213 is considered. Further, the distance $(L_{P2}+L_D)$ obtained by adding the original length $L_D$ of the original D in the conveyance direction to the distance $L_{P2}$ is considered. Then, the reader CPU 301 waits until the conveyance distance $L_{X2}$ of the leading edge part Dt of the back face of the original D becomes equal to the distance $(L_{P2}+L_D)$ obtained by the addition.

When it is confirmed that the conveyance distance $L_{X2}$ of the leading edge part Dt of the back face of the original D is equal to the distance $(L_{P2}+L_D)$ obtained by the addition, the reader CPU 301 proceeds to step S128. In step S128, the reader CPU 301 terminates the operation of reading the back face image of the original D by the back face reading portion 213.

In step S126 and step S128, after terminating the operation of reading the back face image of the original D, the reader CPU 301 proceeds to step S129 to perform discharge processing of the original D. In step S129, the reader CPU 301 monitors the discharge sensor 215. Then, the reader CPU 301 waits until the trailing edge part Dr of the original D passes through the discharge sensor 215 and the discharge sensor 215 is turned off from the turn-on state.

In step S129, when it is determined that the discharge sensor 215 is turned off from the turn-on state, the reader CPU 301 proceeds to step S130. In step S130, the lead motor 307 illustrated in FIG. 3 is driven by a predetermined distance, and the lead motor 307 is stopped after completely discharging the original D onto the discharge tray 217. By doing so, the discharge of the original D is completed.

Thereafter, in step S131, the reader CPU 301 confirms a detection result of the original detection sensor 202, and confirms whether or not an original D that is not yet read remains on the original tray 201. In step S131, when the original D that is not yet read remains on the original tray 201, the reader CPU 301 returns to step S103 to drive the separation motor 306 illustrated in FIG. 3 again, thereby starting the feeding processing of the next original D.

In step S131, when there is no original D that is not yet read on the original tray 201, the reader CPU 301 proceeds to step S132. In step S132, the reader CPU 301 determines that the reading operation for all the originals D put on the original tray 201 is completed. Then, the reader CPU 301 stops all loads such as the respective motors, the front face reading portion 103, the back face reading portion 213, or the like, and proceeds to step S133 to terminate the skimming control for the original D by the ADF 200.

As described above, when using the thin paper original D, there is a case in which the reader image processing portion 304 cannot detect a position of the leading edge part Dt of the original D since the shadow Rs of the leading edge part Dt of the thin paper original D is not clearly cast. In this case, the jam margin $L_{M2}$ which is smaller than the normal jam margin $L_{M1}$ is set as the jam margin $L_M$ for determining the discharge delay jam. As a result, when the jam of the original D occurs at an upstream of the front face reading portion 103 or the back face reading portion 213, a time taken from the occurrence of the jam to the detection of the jam becomes short, such that all loads such as the respective motors, the front face reading portion 103, the back face reading portion 213, or the like are rapidly stopped. As a result, damage to the original D can be suppressed.

At this time, unless the delay amount of the original D is larger than the jam margin $L_{M2}$ which is smaller than the normal jam margin $L_{M1}$, there is no possibility of misdetection of the occurrence of the jam of the original D. Even when conveying the original D that is a thin paper of which the shadow Rs of the leading edge part Dt is not clearly cast, if the original D is normally conveyed without being delayed, it is possible to normally perform the reading of the image without detecting that the jam of the original D occurs. As a result, it is possible to prevent misdetection of the jam of the original D.

It is to be noted that the detection result of the leading edge part Dt of the back face of the original D may be replaced with the jam margin $L_M$ based on the detection result of the leading edge part Dt of the front face of the original D. Further, in the present embodiment, the detection of the discharge delay jam of the original D is based on a point in time at which the lead sensor 209 is turned on from the turn-off state. On the other hands, for example, the detection of the discharge delay jam of the original D may be based on a point in time at which the registration processing by the registration roller 207 is terminated or a point in time at which the registration sensor 206 is turned on from the turn-off state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-019069, filed Feb. 6, 2018, which is hereby incorporated by reference herein in its entirety.

What is claimed is:

1. An original reading apparatus, comprising:
  a feeding portion which feeds an original put on an original tray one by one to a conveyance path;
  a conveyance portion which conveys the original along the conveyance path;
  a discharge portion which discharges the original conveyed along the conveyance path onto a discharge tray;
  a driving device which drives the conveyance portion;
  a first reading portion which reads a first face of the original conveyed along the conveyance path;
  a first sensor which is disposed at an upstream of the first reading portion in a conveyance direction of the original and detects the original;
  a second sensor which is disposed at a downstream of the first reading portion in the conveyance direction of the original and detects the original;
  a leading edge detection portion which detects reaching of a leading edge part of the original to the first reading portion from image data of the first face read by the first reading portion; and a controller which stops the driving device when the second sensor does not detect the original even though the original is conveyed by a first amount or a second amount which is smaller than the first amount from when the original is detected by the first sensor, wherein the first amount is set when the leading edge detection portion detects the leading edge part of the original from the image data of the first face, and the second amount is set when the leading edge detection portion does not detect the leading edge part of the original from the image data of the first face.

2. The original reading apparatus according to claim 1, further comprising:

a second reading portion which reads a second face of the original conveyed along the conveyance path, wherein the second reading portion is disposed at a downstream of the first reading portion in the conveyance direction of the original and at an upstream of the second sensor in the conveyance direction of the original, the leading edge detection portion detects reaching of the leading edge part of the original to the second reading portion from image data of the second face read by the second reading portion, and the controller stops the driving device in a case in which the second sensor does not detect reaching of the leading edge part of the original even though the original is conveyed by a third amount which is smaller than the first amount from when the original is detected by the first sensor, when the leading edge detection portion does not detect the leading edge part of the original from the image data of the second face.

3. The original reading apparatus according to claim 1, wherein the leading edge detection portion detects the leading edge part of the original by detecting, from the image data, a shadow of the leading edge part of the original when light irradiated from a light source is blocked by the original.

* * * * *